(12) United States Patent
Morinaga et al.

(10) Patent No.: US 10,935,858 B2
(45) Date of Patent: Mar. 2, 2021

(54) LIQUID CRYSTAL DISPLAY DEVICE

(71) Applicant: SHARP KABUSHIKI KAISHA, Osaka (JP)

(72) Inventors: Junichi Morinaga, Sakai (JP); Mitsunori Harada, Sakai (JP); Masahiro Yoshida, Sakai (JP); Tomoo Furukawa, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 146 days.

(21) Appl. No.: 16/302,625

(22) PCT Filed: May 10, 2017

(86) PCT No.: PCT/JP2017/017614
§ 371 (c)(1),
(2) Date: Nov. 17, 2018

(87) PCT Pub. No.: WO2017/199799
PCT Pub. Date: Nov. 23, 2017

(65) Prior Publication Data
US 2019/0317375 A1 Oct. 17, 2019

(30) Foreign Application Priority Data
May 17, 2016 (JP) .............................. JP2016-098725

(51) Int. Cl.
*G02F 1/1362* (2006.01)
*G02F 1/1333* (2006.01)
(Continued)

(52) U.S. Cl.
CPC ...... *G02F 1/136286* (2013.01); *G02F 1/1343* (2013.01); *G02F 1/133345* (2013.01);
(Continued)

(58) Field of Classification Search
CPC ......... G02F 1/136286; G02F 1/136227; G02F 1/136213; G02F 1/1368;
(Continued)

(56) References Cited

U.S. PATENT DOCUMENTS

2007/0242203 A1 10/2007 Lee et al.
2011/0050551 A1 3/2011 Ota et al.
(Continued)

FOREIGN PATENT DOCUMENTS

JP 2011-053443 A 3/2011
JP 2011-164658 A 8/2011
(Continued)

*Primary Examiner* — Angela K Davison
(74) *Attorney, Agent, or Firm* — ScienBiziP, P.C.

(57) ABSTRACT

The present invention provides a liquid crystal display device for which laser repair can be easily performed to correct a defect pixel, and/or a liquid crystal display device capable of reducing generation of contact failure and a short circuit. The liquid crystal display device of the present invention includes a first substrate, a liquid crystal layer, and a second substrate in the given order. The first substrate includes: an insulating substrate; a scanning line; a data line; a first insulating film disposed between the scanning line and the data line; a common line extending in an extension direction of the scanning line or the data line; a counter electrode facing the common line with the first insulating film in between; a switching element being connected to the scanning line and the data line; a second insulating film; a pixel electrode being connected to the switching element and the counter electrode; a third insulating film; and a common electrode being provided with an opening. The switching element, the second insulating film, the pixel electrode, the third insulating film, and the common electrode are disposed in the given order toward the liquid crystal layer.

18 Claims, 20 Drawing Sheets

(51) Int. Cl.
*G02F 1/1337* (2006.01)
*G02F 1/1343* (2006.01)

(52) U.S. Cl.
CPC .. *G02F 1/133711* (2013.01); *G02F 2201/121* (2013.01); *G02F 2201/123* (2013.01)

(58) Field of Classification Search
CPC ........ G02F 2001/134372; G02F 2001/134354; G02F 2001/134318; G02F 2001/136272; G02F 2201/121; H01L 27/1255; H01L 27/3276; G09G 2300/043; G09G 2300/0434
See application file for complete search history.

(56) References Cited

U.S. PATENT DOCUMENTS

| | | |
|---|---|---|
| 2012/0008072 A1 | 1/2012 | Lee et al. |
| 2012/0270372 A1 | 10/2012 | Lee et al. |
| 2013/0102098 A1 | 4/2013 | Lee et al. |
| 2014/0176891 A1* | 6/2014 | Hisada .............. G02F 1/136209 349/139 |
| 2015/0076501 A1* | 3/2015 | Hayashi ................ G02F 1/1368 257/72 |

FOREIGN PATENT DOCUMENTS

| | | |
|---|---|---|
| JP | 2011-203748 A | 10/2011 |
| WO | 2013/021926 A1 | 2/2013 |
| WO | 2013/031823 A1 | 3/2013 |

* cited by examiner (1)

LIQUID CRYSTAL DISPLAY DEVICE

TECHNICAL FIELD

The present invention relates to liquid crystal display devices. The present invention specifically relates to a liquid crystal display device that includes a substrate including electrodes in a plurality of layers with an insulating film between each two adjacent layers.

BACKGROUND ART

Liquid crystal display devices are devices that include a liquid crystal display panel and control transmission/blocking of light (turning on/off the display) by controlling the alignment of birefringent liquid crystal molecules. Liquid crystal display devices are in a display (liquid crystal alignment) mode such as the twisted nematic (TN) mode in which liquid crystal molecules having positive anisotropy of dielectric constant are aligned such that the alignment is twisted by 90° as viewed from the direction normal to the substrates, or the vertical alignment (VA) mode in which liquid crystal molecules having negative anisotropy of dielectric constant are aligned in the direction perpendicular to the substrate surfaces. Some display modes which have received attention owing to their characteristics such as easy achievement of wide viewing angle characteristics are the in-plane switching (IPS) mode and the fringe field switching (FFS) mode in each of which liquid crystal molecules having positive or negative anisotropy of dielectric constant are aligned in the direction parallel to the substrate surfaces so that a transverse electric field is generated in the liquid crystal layer.

A common method for driving such a liquid crystal display device is the active matrix driving method which utilizes active elements such as thin-film transistors (TFTs) in the respective pixels to achieve high resolution. A liquid crystal display device with TFTs is, for example, a liquid crystal display device including an active matrix substrate on which scanning signal lines and data signal lines are disposed to intersect each other and TFTs and pixel electrodes are disposed at the respective intersections. A common liquid crystal display device further includes a common electrode on the active matrix substrate or the counter substrate such that voltage is applied to the liquid crystal layer by the pixel electrodes paired with the counter electrode.

Examples of the active matrix substrate in a liquid crystal display device include one with a glass substrate, conductive members such as scanning signal lines, data signal lines, and TFTs which are formed on the glass substrate, a transparent electrode, and pixel electrodes (for example, Patent Literatures 1 to 5).

Patent Literature 1 discloses in Embodiment 5 a liquid crystal display panel having a configuration corresponding to the FFS mode, in which the drain lead lines, connected to the respective pixel electrodes through the respective contact holes formed in the insulating film, overlap the auxiliary capacitance lines to which the same potential as that supplied to the common electrode is supplied. If a sub-pixel that should appear black appears as a bright spot in the liquid crystal display panel disclosed in Patent Literature 1 due to leakage current between some conductive lines or electrodes, the laser melting technique is used which irradiates the corresponding overlapping portion of the drain lead line and the auxiliary capacitance line with a laser beam. This supplies the same potential to the corresponding pixel electrode and the common electrode to make the defective sub-pixel appear as a black spot, making the defect unnoticeable.

Patent Literature 2 discloses a technique to prevent recurrence of defect at a laser-irradiated site in an FFS mode liquid crystal display panel by forming a through hole in an electrode at a position where the electrode overlaps a data signal line, and keeping the portion of the data signal line overlapping the through hole for laser repair.

Patent Literatures 3 and 4 each disclose an array substrate for a transverse electric field mode liquid crystal display device. The substrate is produced by four mask processes, and has a semiconductor layer being exposed at each side of the data line. The technique disclosed enables production of a high-resolution liquid crystal display device causing no wavy noise by providing to the array substrate a first blocking pattern, which blocks light and is disposed under the semiconductor layer, and a second blocking pattern, which is disposed over the data line and prevents the influence of the semiconductor layer while being in contact with the data line.

Patent Literature 5 discloses a liquid crystal display panel that includes an array substrate including scanning lines, signal lines, an interlayer resin film, a lower electrode, an inter-electrode insulating film, and an upper electrode provided with slit openings. The upper electrode is formed in the entire display area and is electrically connected to a common lead line around the display area to operate as a common electrode. In the display area, common lines are formed in the direction parallel to the scanning lines. The upper electrode is electrically connected to the common lines through the corresponding contact holes. This liquid crystal display panel reduces the resistance of the common electrode formed over all sub-pixels in the display area.

CITATION LIST

Patent Literature

Patent Literature 1: WO 2013/021926
Patent Literature 2: WO 2013/031823
Patent Literature 3: JP 2011-164658 A
Patent Literature 4: JP 2011-203748 A
Patent Literature 5: JP 2011-53443 A

SUMMARY OF INVENTION

Technical Problem

The present inventors made various studies on a technique to correct a defect found in an inspection step of an FFS mode liquid crystal display device including an active matrix substrate as described above. The inspection step here is one performed after bonding the active matrix substrate and the counter substrate to each other and injecting liquid crystal between the substrates, or one performed after dropping liquid crystal onto the active matrix substrate or the counter substrate and then bonding the substrates to each other. The defect may specifically be, for example, a phenomenon in which a display unit that should appear black appears as a bright spot due to leakage current between some conductive lines or electrodes. Such a defect is corrected by turning a bright spot pixel into a black spot pixel.

FIG. 17 is a schematic plan view of an active matrix substrate in a liquid crystal display device of Comparative Embodiment 1. FIG. 18 is a schematic cross-sectional view of the active matrix substrate in the liquid crystal display device of Comparative Embodiment 1. FIG. 18 shows a cross section taken along the line v-w shown in FIG. 17.

The liquid crystal display device of Comparative Embodiment 1 is a normally black FFS mode liquid crystal display device. A first substrate 10 includes, on an insulating substrate 11, scanning lines 12, a first insulating film 31, data lines 13, TFTs 18, a second insulating film 32, pixel electrodes 16, a third insulating film 33, and a common electrode 15, in the given order from the insulating substrate 11 side. The common electrode 15 is provided with slit openings 15a. The TFTs 18 each include a gate electrode 18a, a source electrode 18b, a drain electrode 18c, and a semiconductor layer 18f. The pixel electrodes 16 and the respective drain electrodes 18c are connected to each other through respective contact holes 51. The common electrode 15 and the pixel electrodes 16 are typically made of a transparent conductive material such as indium tin oxide (ITO), indium zinc oxide (IZO), zinc oxide (ZnO), or tin oxide (SnO), or an alloy of any of these materials.

A defective pixel in the liquid crystal display device of Comparative Embodiment 1 occurs due to a cause such as a short circuit between the corresponding scanning line 12 and the corresponding data line 13 or a short circuit between the corresponding source electrode 18b (or data line 13) and the corresponding drain electrode 18c. Such a defective pixel can be made unnoticeable by separating the corresponding pixel electrode 16 from the corresponding TFT 18 and then causing a short circuit between the pixel electrode 16 and the common electrode 15.

The transparent conductive materials and alloys thereof used for the pixel electrode 16 and the common electrode 15, however, hardly interfere with laser beams. Such a transparent conductive material and an alloy thereof, unlike an opaque metal, are not prone to absorb laser energy to melt. The pixel electrode 16 and the common electrode 15 are therefore less likely to break the third insulating film 33 in between to connect to each other.

FIG. 19 is a schematic plan view of an active matrix substrate in a liquid crystal display panel disclosed in Embodiment 5 of Patent Literature 1. FIG. 20 is a schematic cross-sectional view of the liquid crystal display panel disclosed in Embodiment 5 of Patent Literature 1. FIG. 20 shows a cross section taken along the line x-y shown in FIG. 19.

The liquid crystal display panel disclosed in Embodiment 5 of Patent Literature 1 is an FFS mode liquid crystal display panel that includes an active matrix substrate 110, a liquid crystal layer 140, and a counter substrate 120 in the given order. The active matrix substrate 110 includes a glass substrate 111, auxiliary capacitance lines 114, a first insulating film 131, drain lead lines 119, a second insulating film 132, a common electrode 115, a third insulating film 133, pixel electrodes 116, and an alignment film 134, in the given order from the glass substrate 111 toward the liquid crystal layer 140. The pixel electrodes 116 are closer to the liquid crystal layer 140 than the common electrode 115 is. Each pixel electrode 116 is provided with slits 116a. The liquid crystal display panel disclosed in Embodiment 5 of Patent Literature 1 includes gate bus lines 112, source bus lines 113, and TFTs 118 near the respective intersections between the gate bus lines 112 and the source bus lines 113. The TFTs 118 each include a gate electrode 118a, a source electrode 118b, a drain electrode 118c, and a semiconductor layer 118f. The counter substrate 120 includes a glass substrate 121 and an alignment film 122 on the glass substrate 121.

The pixel electrodes 116 and the respective drain lead lines 119 are connected at respective contact portions 153. A defective pixel can be corrected to appear as a black spot by irradiating a corresponding laser irradiation site 161 with a laser beam, and short-circuiting the corresponding auxiliary capacitance line 114 and the corresponding drain lead line 119, which are made of a metal such as titanium.

The liquid crystal display panel disclosed in Embodiment 5 of Patent Literature 1, however, includes each laser irradiation site 161 and the corresponding contact portion 153 at the same position. This may limit the shape of the electrode for suitable operation of the contact portion 153 to lower the degree of freedom in layout of the members on the active matrix substrate 110, decreasing the aperture ratio. For example, when a contact hole is formed in an organic film having a thickness of about 3 μm, the contact portion 153 may have a 8-μm-square shape and the corresponding drain lead line 119 may have a shape suited to the contact portion 153.

The contact portion 153 in the liquid crystal display panel disclosed in Embodiment 5 of Patent Literature 1 is away from the corresponding TFT 118. This structure is likely to cause a defective pixel when the corresponding drain lead line 119 is disconnected.

The liquid crystal display panel disclosed in Embodiment 5 of Patent Literature 1 is also provided with many contact holes in the insulating film to connect the pixel electrodes 116 and the respective drain lead lines 119, and thus is likely to cause contact failure. The common electrode 115 is also removed in the contact portions 153. A residual film of the common electrode 115 in a contact portion 153 may unfortunately cause a short circuit between the corresponding pixel electrode 116 and the common electrode 115.

In response to the above issues, an object of the present invention is to provide a liquid crystal display device for which laser repair can be easily performed to correct a defective pixel. Another object of the present invention is to provide a liquid crystal display device capable of reducing generation of contact failure and a short circuit.

Solution to Problem

The present inventors made various studies on how to reduce generation of contact failure and a short circuit and how to easily correct a defective pixel to appear as a black spot pixel. The studies found that disposing a common electrode in the upper layer of pixel electrodes with an insulating film in between allows reduction in the number of insulating films provided between the pixel electrodes and the respective switching elements and the number of insulating films in which contact holes are formed, and allows the pixel electrodes to connect to the respective switching elements without removing the common electrode at the sites where contact holes are formed. The studies also found that with a structure in which counter electrodes, connected to the respective switching elements and the respective pixel electrodes, face the corresponding common lines with an insulating film in between, these conductive lines and electrodes can be formed of a material other than a transparent conductive material and an alloy thereof so as to be suitable for laser repair. Thereby, the inventors successfully achieved the above objects, completing the present invention.

In other words, one aspect of the present invention may be a liquid crystal display device including a first substrate, a liquid crystal layer, and a second substrate, the first substrate including in the given order: an insulating substrate; a scanning line; a data line; a first insulating film disposed between the scanning line and the data line; a common line extending in an extension direction of the scanning line or the data line; a counter electrode facing the common line with the first insulating film in between; a switching element being connected to the scanning line and the data line; a second insulating film; a pixel electrode being connected to the switching element and the counter electrode; a third insulating film; and a common electrode being provided with an opening, the switching element, the second insulating film, the pixel electrode, the third insulating film, and the common electrode being disposed in the given order toward the liquid crystal layer.

The switching element may be a thin-film transistor, and the pixel electrode may be connected to a drain electrode of the thin-film transistor through a contact hole formed right above the drain electrode, not right above the counter electrode.

The switching element may be a thin-film transistor, the pixel electrode may be connected to a drain electrode of the thin-film transistor through a first contact hole formed in the second insulating film, right above the drain electrode, and the contact hole formed in the second insulating film may be positioned closer to the thin-film transistor than the counter electrode is.

The contact hole may extend outside an outline of the drain electrode.

The second insulating film may include an inorganic film and an organic film stacked on the inorganic film.

The drain electrode may include a lower layer containing a metal other than aluminum, and an upper layer being stacked on the lower layer and containing aluminum, and the pixel electrode may be in contact with the lower layer of the drain electrode.

In the contact hole, the upper layer of the drain electrode may be indented inside the second insulating film from an edge of the second insulating film.

The first substrate may further include a semiconductor layer stacked on the first insulating film in a region corresponding to the contact hole.

The common electrode may extend over the counter electrode.

The switching element may be a thin-film transistor, the counter electrode may be disposed in the same layer as the drain electrode of the thin-film transistor, and the counter electrode may be connected to the drain electrode via a drain lead line disposed in the same layer as the counter electrode and the drain electrode.

The pixel electrode may be connected to the counter electrode through a second contact hole formed in the second insulating film, right above the counter electrode.

The counter electrode may include an outside portion that extends outside an outline of the common line in the direction perpendicular to the common line, the outside portion may include a first region with the second contact hole extending in the direction perpendicular to the common line and a second region with no second contact hole extending in the direction perpendicular to the common line, and a width of the first region in the direction perpendicular to the common line may be smaller than a width of the second region in the direction perpendicular to the common line.

The switching element may be a thin-film transistor, and the counter electrode may be formed in the same layer as the drain electrode of the thin-film transistor and may be disposed separately from the drain electrode.

The common line may be connected to the common electrode through a contact hole formed at least in the second insulating film and in the third insulating film.

The contact hole formed at least in the second insulating film and in the third insulating film may be formed in not all pixels.

The switching element may be a thin-film transistor, the pixel electrode may be electrically connected to the thin-film transistor through a contact hole formed in the second insulating film, and the common electrode may not be disposed at the position corresponding to the contact hole formed in the second insulating film.

Advantageous Effects of Invention

The liquid crystal display device of the present invention allows easy laser repair to correct a defective pixel.

The liquid crystal display device of the present invention is also capable of reducing generation of contact failure and a short circuit.

BRIEF DESCRIPTION OF DRAWINGS

FIG. 1-2 is a view of the liquid crystal display device of Embodiment 1 with a common electrode highlighted.

FIG. 1-3 is a view of the liquid crystal display device of Embodiment 1 with pixel electrodes highlighted.

FIG. 1-4 is a view of the liquid crystal display device of Embodiment 1 with a black matrix highlighted.

FIG. 2 is a schematic cross-sectional view of the liquid crystal display device of Embodiment 1.

FIG. 3 is a schematic cross-sectional view of a TFT and a contact hole in the liquid crystal display device of Embodiment 1.

FIG. 4 is a schematic plan view of the liquid crystal display device of Embodiment 1, illustrating a portion of a pixel.

FIG. 6-1 is an exemplary schematic enlarged plan view of the portion BB in the liquid crystal display device of Embodiment 1 shown in FIG. 4.

FIG. 6-2 is another exemplary schematic enlarged plan view of the portion BB in the liquid crystal display device of Embodiment 1 shown in FIG. 4.

DESCRIPTION OF EMBODIMENTS

Embodiments of the present invention are described below. The embodiments, however, are not intended to limit the scope of the present invention, and may appropriately be modified within the spirit of the present invention.

In the following description, the same members or members having similar functions are provided commonly with the same or similar reference sign between different figures, and thus description of such a member is omitted. The configurations in the embodiments may appropriately be combined or modified within the spirit of the present invention.

A "pixel" as used herein means a region surrounded by two adjacent scanning lines (gate bus lines) and two adjacent data lines (source bus lines).

A "region" as used herein means a three-dimensional region including the depth as well as the planar dimensions, as viewed from the direction normal to a surface of the first substrate.

The following Embodiments 1 to 3 describe a laser repair process which short-circuits a common line and a counter electrode.

The configurations of the following Embodiments 1 to 3 are effective in, for example, laser repair to turn a bright spot pixel into a black spot pixel when a display unit that should appear black appears as a bright spot due to leakage current between some conductive lines or electrodes.

The display (liquid crystal alignment) mode in the following Embodiments 1 to 3 is a normally black fringe field switching (FFS) mode which utilizes a transverse electric field (which may be a fringe electric field) generated between pixel electrodes and a common electrode, horizontal alignment films on which alignment treatment (e.g., rubbing) is performed to provide homogeneous alignment as the initial alignment to liquid crystal molecules, and liquid crystal molecules having positive or negative anisotropy of dielectric constant. The concepts of Embodiments 1 to 3 are specifically applicable to liquid crystal display devices such as televisions, personal computers, cellphones, car navigation systems, and information displays.

Embodiment 1

Figure 1:
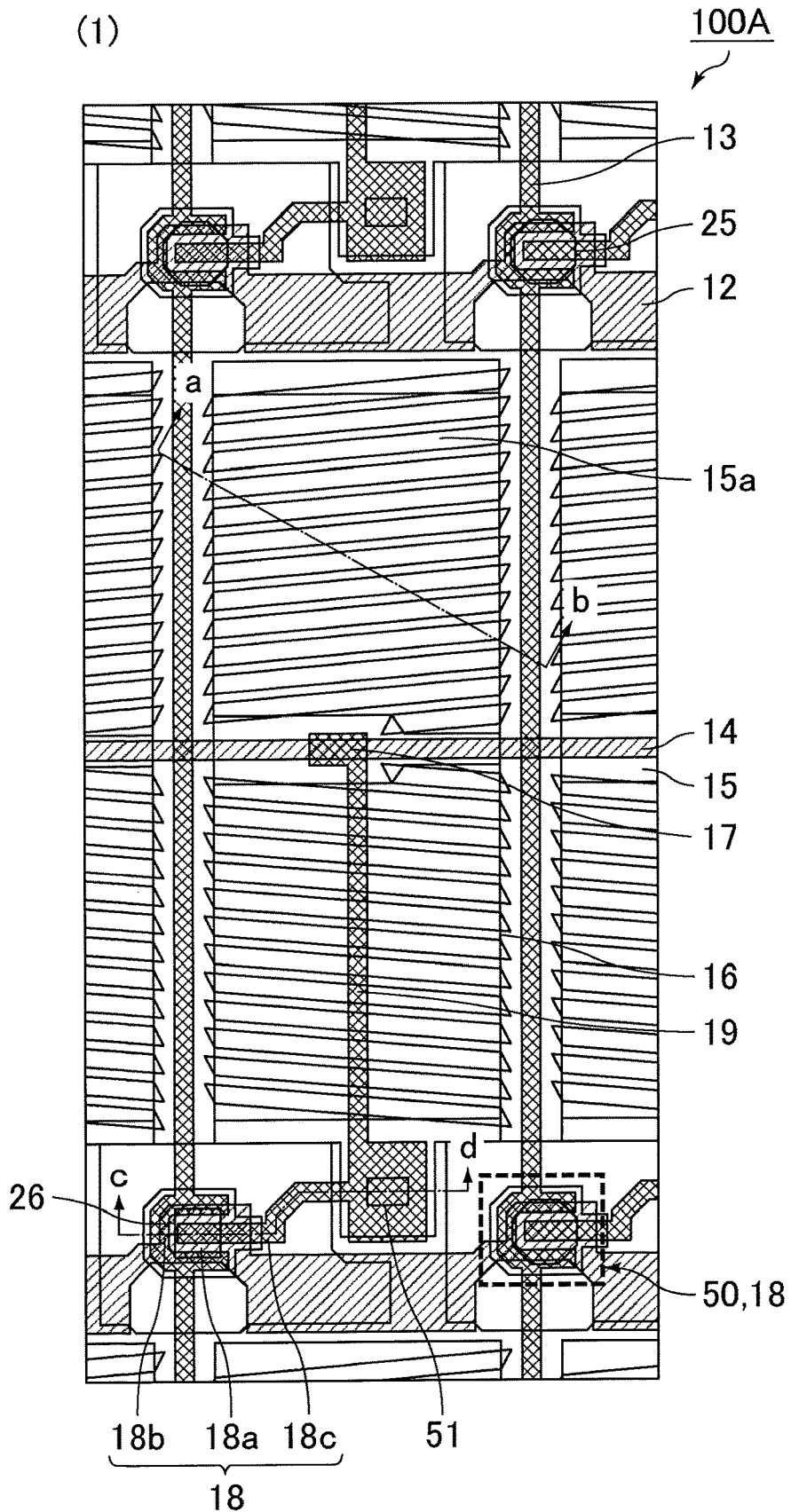
FIG. 1-1 is a schematic plan view of a pixel in a liquid crystal display device of Embodiment 1.
Figures 1, 2:
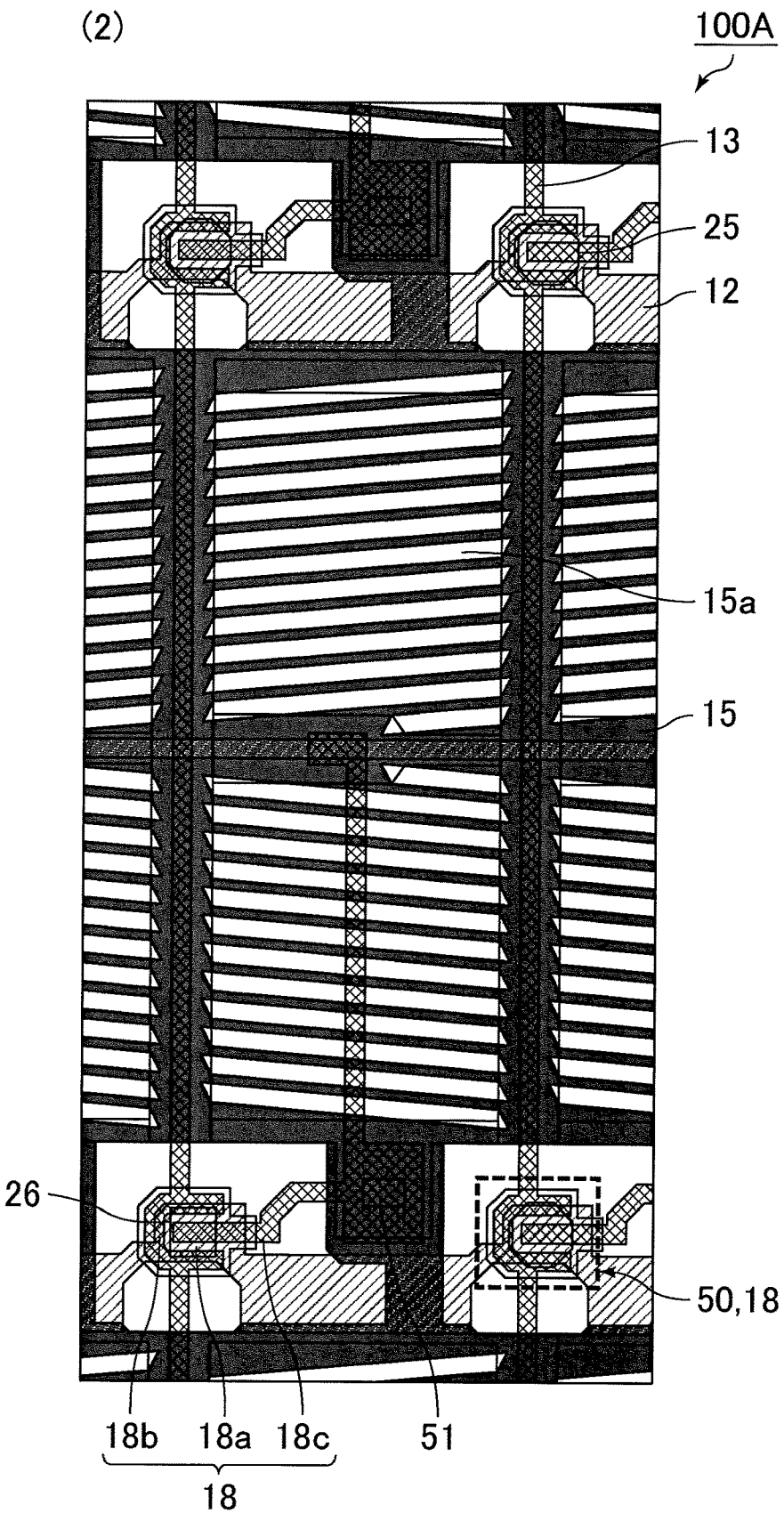
Figures 1, 2, 3:
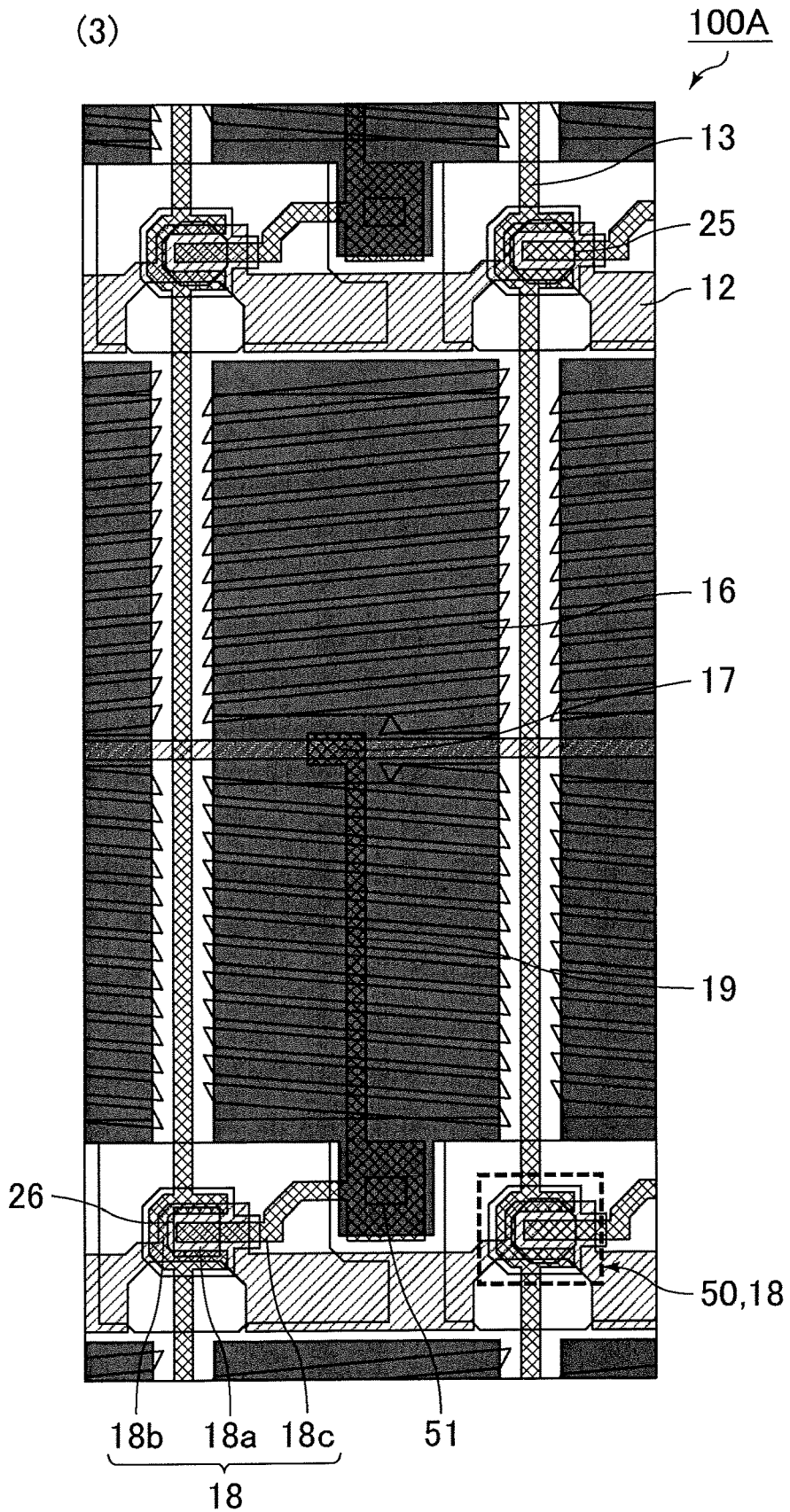
Figure 9:
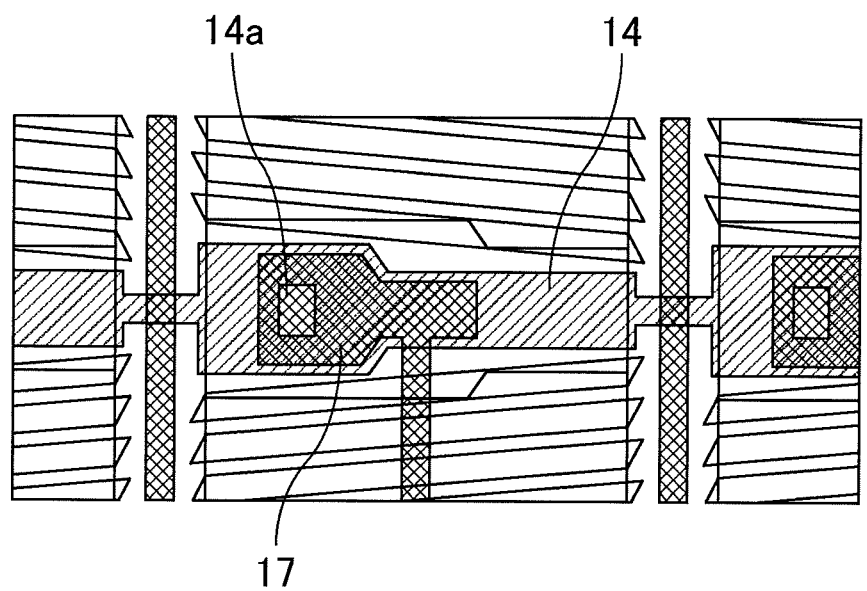
FIG. 9 is a schematic plan view of an exemplary shape of an opening in a common line in the liquid crystal display device of Embodiment 1.

A liquid crystal display device of Embodiment 1 is described with reference to FIG. 1-1 to FIG. 9. FIG. 1-1 is a schematic plan view of a pixel in a liquid crystal display device of Embodiment 1. FIG. 1-2 is a view of the liquid crystal display device of Embodiment 1 with a common electrode highlighted. FIG. 1-3 is a view of the liquid crystal display device of Embodiment 1 with pixel electrodes highlighted. FIG. 1-4 is a view of the liquid crystal display device of Embodiment 1 with a black matrix highlighted. FIG. 2 is a schematic cross-sectional view of the liquid crystal display device of Embodiment 1. FIG. 3 is a schematic cross-sectional view of a TFT and a contact hole in the liquid crystal display device of Embodiment 1. FIG. 2 shows a cross section taken along the line a-b shown in FIG. 1-1. FIG. 3 shows a cross section taken along the line c-d shown in FIG. 1-1.

A liquid crystal display device 100A of Embodiment 1 is a normally black FFS mode liquid crystal display device. The liquid crystal display device 100A of Embodiment 1 includes the first substrate 10, a liquid crystal layer 40, and a second substrate 20 in the given order. The first substrate 10 includes the insulating substrate 11, the scanning lines 12, the data lines 13, the first insulating film 31 between the scanning lines 12 and the data lines 13, common lines 14 extending in the extension directions of the scanning lines 12 or the data lines 13, counter electrodes 17 facing the respective common lines 14 with the first insulating film 31 in between, the TFTs 18 each connected to the corresponding scanning line 12 and the corresponding data line 13, the second insulating film 32, the pixel electrodes 16 each connected to the corresponding TFT 18 and the corresponding counter electrode 17, the third insulating film 33, and the common electrode 15 provided with the openings 15a. The TFTs 18, the second insulating film 32, the pixel electrodes 16, the third insulating film 33, and the common electrode 15 are disposed in the given order toward the liquid crystal layer 40.

As shown in FIG. 1-1, the liquid crystal display device 100A of Embodiment 1 includes the first substrate 10 including the scanning lines 12 and the data lines 13. The first substrate 10 is also referred to as an active matrix substrate. The scanning lines 12 and the data lines 13 in the first substrate 10 are disposed such that they intersect each other with the first insulating film 31 in between and surround the pixel electrodes 16. The scanning lines 12 and the data lines 13 may overlap the pixel electrodes 16. The thin-film transistors (TFTs) 18, which function as switching elements 50, are disposed near the respective intersections between the scanning lines 12 and the data lines 13. At the positions corresponding to the TFTs 18 between the first substrate 10 and the second substrate 20 are disposed sub-spacers 25 and main spacers 26a to maintain a constant gap and form the liquid crystal layer 40 in this gap. The sub-spacers 25 are lower than the main spacers 26 by, for example, about 0.2 μm to 1.0 μm.

The scanning lines 12 and the data lines 13 are formed by forming a single or multiple layers of a metal such as titanium, aluminum, molybdenum, copper, or chromium, or an alloy thereof by a technique such as sputtering, and patterning the layer(s) by a technique such as photolithography.

The gate electrode 18a of each TFT 18 is part of the corresponding scanning line 12. The source electrode 18b of the TFT 18 is the U-shaped portion formed between the straight parts of the corresponding data line 13. Thereby, the TFT 18 is connected to the scanning line 12 and the data line 13. A drain lead line 19 extends from the drain electrode 18c of the TFT 18. The drain lead line 19 extends to around the central portion of the corresponding pixel and is connected to the corresponding counter electrode 17. The drain lead line 19 extends to overlap the later-described slit openings 15a and crosses the openings 15a. The drain electrode 18c does not intersect any of the openings 15a.

The gate electrode 18a, the source electrode 18b, and the drain electrode 18c of the TFT 18 are formed by forming a single or multiple layers of a metal such as titanium, aluminum, molybdenum, copper, or chromium, or an alloy thereof by a technique such as sputtering, and patterning the layer(s) by a technique such as photolithography.

The common electrode 15 is to supply a common potential to the pixels, and thus covers the scanning lines 12 and the data lines 13 with the later-described third insulating film 33 in between and is formed over substantially the entire surface of the first substrate 10 (except for the regions corresponding to the openings for fringe electric field generation and the TFTs 18) as shown in FIG. 1-2. The common electrode 15 is preferably disposed also right above the counter electrodes 17. The common electrode 15 may be electrically connected to an external connection terminal at the outer periphery (frame region) of the first substrate 10. The common electrode 15 is provided with the slit openings 15a in each pixel such that fringe electric fields can be generated.

The pixel electrodes 16 are, as shown in FIG. 1-3, planar electrodes provided with no openings, are disposed in the respective regions surrounded by the scanning lines 12 and the data lines 13, and each have a substantially quadrangular shape. The pixel electrodes 16 are arrayed in a matrix form.

Each pixel electrode 16 is connected to the drain electrode 18c of the corresponding TFT 18 through the corresponding contact hole 51 that is formed right above the drain electrode 18c, not right above the corresponding counter electrode 17. The drain electrode 18c includes not only the portion overlapping the gate electrode 18a but also the portion extending to the vicinity of the corresponding scanning line 12. In other words, the pixel electrode 16 is connected to the drain electrode 18c of the TFT 18 through the contact hole 51 formed in the second insulating film 32 right above the drain electrode 18c, and the contact hole 51 is positioned closer to the TFT 18 than the counter electrode 17 is. Such a structure can reduce the restriction on the layout of the drain lead line 19 and reduce defects caused by disconnection.

The pixel electrode 16 is therefore connected to the drain electrode 18c of the TFT 18, the counter electrode 17 extends from the drain electrode 18c of the TFT 18 via the drain lead line 19, and the pixel electrode 16, drain electrode 18c (switching element 50), and counter electrode 17 are electrically connected to each other.

The common electrode 15 and the pixel electrode 16 can be formed by forming a single or multiple layers of a transparent conductive material such as titanium, aluminum, molybdenum, copper, or chromium, or an alloy thereof by a technique such as sputtering, and patterning the layer(s) by a technique such as photolithography.

The common electrode 15 in the liquid crystal display device 100A of Embodiment 1 is disposed in the upper layer (liquid crystal layer 40 side) of the pixel electrode 16 with the third insulating film 33 in between. If the pixel electrode 16 is formed in the upper layer of the common electrode 15, the common electrode 15 needs to be removed in the contact hole 51 to connect the pixel electrode 16 and the drain electrode 18c. A residual film of the common electrode 15 may unfortunately cause a short circuit between the pixel electrode 16 and the common electrode 15. The liquid crystal display device 100A of Embodiment 1, including the common electrode 15 in the upper layer of the pixel electrode 16, is less likely to cause such a defect.

The common lines 14 can be used for laser repair, and may be utilized as auxiliary capacitance lines. The common lines 14 extend in the extension direction of the scanning lines 12. The expression "the common lines 14 extend in the extension direction of a conductive line" as used herein means that the common lines 14 extend in the extension direction of the conductive line without overlapping or crossing the conductive line. The common lines 14 may not be parallel to the conductive line, but are preferably parallel to the scanning lines 12. The common lines 14 are also preferably disposed in the same layer as the scanning lines 12. This structure increases the production efficiency.

The common lines 14 in the liquid crystal display device of each of Embodiments 1 to 3 extend in the extension direction of the scanning lines 12. Yet, the common lines 14 may extend in the extension direction of the data lines 13. In this case, the common lines 14 preferably extend parallel to the data lines 13. Each common line 14 is disposed over pixels present in the extension direction of the scanning lines 12 or the data lines 13 and used commonly by the pixels.

When the common lines 14 extend in the extension direction of the scanning lines 12, the pixels are preferably vertically long as in the liquid crystal display devices of Embodiments 1 to 3. When the common lines 14 extend in the extension direction of the data lines 13, the pixels are preferably horizontally long. The horizontally long pixels can be, for example, those obtained by tripling the number of the scanning lines 12 and reducing the number of the data lines 13 to ⅓ from those of the vertically long pixel structure shown in Embodiments 1 to 3 (triple gate scanning). The horizontally long pixels can also be, for example, those obtained by doubling the number of the scanning lines 12 and halving the number of the data lines 13 from those of the vertically long pixel structure shown in Embodiments 1 to 3 (double gate scanning).

When the concept of the present embodiment is applied to such horizontally long pixels, for example, the common lines 14, extending in the extension direction of the data lines 13 and formed in the same layer as the scanning lines 12, may be disposed in a layer different from the scanning lines 12 (e.g., in the same layer as the date lines 13) at the intersections with the scanning lines 12.

Alternatively, the common lines 14 extending in the extension direction of the data lines 13 may be formed in the same layer as the data lines 13, and the counter electrodes 17 may be formed in a different layer (e.g., in the same layer as the scanning lines 12).

Each common line 14 may include a bent portion or branched portion, for example. The common line 14 is regarded as extending parallel also when they extend in a substantially parallel direction as long as the effects of the present invention is achieved.

The common line 14 can be formed of a conductive material other than a transparent conductive material and an alloy thereof and appropriately selected depending on the laser beams used. For effective absorption of laser beams, the common line 14 is preferably formed of a metal. More specifically, the common line 14 can be formed by forming a single or multiple layers of a metal such as titanium, aluminum, molybdenum, copper, or chromium, or an alloy thereof by a technique such as sputtering, and patterning the layer(s) by a technique such as photolithography.

To the common line 14 is preferably supplied the same potential (substantially the same potential) as that supplied to the common electrode 15. This increases the success rate in correcting the defective pixel to appear as a black spot pixel. For this purpose, the common line 14 in Embodiment 1 is connected to the common electrode 15. The common line 14 in Embodiment 1 is connected to the common electrode 15 outside the display region. Yet, the common line 14 may be connected to the common electrode 15 at sites in the display region. This can give a low resistance to the common electrode 15, so that the potential of the common electrode 15 can be further stabilized and display defects such as shadowing can be reduced.

The counter electrode 17 is disposed in the same layer as the drain electrode 18c of the TFT 18, and is connected to the drain electrode 18c via the drain lead line 19 disposed in the same layer as the counter electrode 17 and the drain electrode 18c. The counter electrode 17 is preferably disposed in the same layer as the data line 13. This increases the production efficiency.

The counter electrode 17 can be formed of a conductive material other than a transparent conductive material and an alloy thereof and appropriately selected depending on the laser beams used. For effective absorption of laser beams, the counter electrode 17 is preferably formed of a metal or an alloy. More specifically, the counter electrode 17 can be formed by forming a single or multiple layers of a metal such as titanium, aluminum, molybdenum, copper, or chromium, or an alloy thereof by a technique such as sputtering, and patterning the layer(s) by a technique such as photolithography.

Part of the common line 14 faces (overlaps) at least part of the counter electrode 17 with the first insulating film 31 in between. An overlapping portion 62 where the common line 14 and the counter electrode 17 overlap each other can be used as a laser repair region. Since the common line 14 and the counter electrode 17 can be formed of a material other than a transparent conductive material and an alloy thereof, laser repair can be easily performed. For example, laser repair can be more easily performed when the common line 14 and the counter electrode 17 are formed of a metal.

Since the counter electrode 17 is connected to the pixel electrode 16, irradiating the overlapping portion 62 with a laser beam to connect the counter electrode 17 and the common line 14 when the common line 14 and the common electrode 15 are at the same potential enables supply of the same potential to the common electrode 15 and the pixel electrode 16. Since the common electrode 15 and the pixel electrode 16 are often transparent electrodes, directly connecting them to each other by laser beam irradiation is difficult. Also, when the common electrode 15 and the pixel electrode 16 are irradiated with a laser beam, which has high energy, in the state where the first substrate 10 and the second substrate 20 are bonded to each other and the liquid crystal layer 40 is held between the substrates 10 and 20, debris of the common electrode 15 may be scattered to the liquid crystal layer 40 or members such as the alignment films, color filters, and black matrix may be broken. The liquid crystal display device 100A of Embodiment 1, in contrast, can utilize a material other than a transparent conductive material for the common line 14 and the counter electrode 17. Hence, the same potential can be supplied to the common electrode 15 and the pixel electrode 16, which are transparent electrodes, by irradiating the common line 14 and the counter electrode 17 formed of a material such as a metal with laser beams, for example. Thereby, a defective pixel due to a factor such as leakage current between the conductive lines or electrodes can be easily corrected to appear as a black spot pixel. Since the common line 14 is connected to the common electrode 15 in the present embodiment, irradiating the counter electrode 17 with a laser beam to connect the counter electrode 17 to the common line 14, causes a short circuit between the common electrode 15 and the pixel electrode 16 to make the potentials substantially the same as each other.

The conductive lines and electrodes, including the scanning lines 12, the data lines 13, the common lines 14, the counter electrodes 17, and the gate electrodes 18a, source electrodes 18b, and drain electrodes 18c constituting the respective TFTs 18 can be formed using the same material in the same step as long as they are formed in the same layer. This increases the production efficiency.

As shown in FIG. 2, the liquid crystal display device 100A of Embodiment 1 includes the first substrate 10, the second substrate 20, the liquid crystal layer 40 held between the first substrate 10 and the second substrate 20, and a backlight (not illustrated) disposed behind the first substrate 10 (on the side remote from the liquid crystal layer 40). The second substrate 20 is also referred to as a counter substrate 20.

The first substrate 10, the liquid crystal layer 40, and the second substrate 20 in the liquid crystal display device 100A of Embodiment 1 are disposed in the given order from the backlight side. The first substrate 10 includes a first polarizer (not illustrated), the insulating substrate (e.g., glass substrate) 11, the TFTs 18 (not illustrated), the second insulating film 32, the pixel electrodes 16, the third insulating film 33, and the common electrode 15 in the given order toward the liquid crystal layer 40.

The common electrode 15 and the pixel electrodes 16 are stacked with the third insulating film 33 in between. Below the openings 15a in the common electrode 15 are the pixel electrodes 16. Generating a potential difference between the pixel electrodes 16 and the common electrode 15 in this structure generates a fringe-like electric field around the openings 15a in the common electrode 15.

The second substrate 20 is a counter substrate and includes a second polarizer (not illustrated), an insulating substrate (e.g., glass substrate) 21, a black matrix 22, color filters 23, and an overcoat layer 24 stacked toward the liquid crystal layer 40 side. The first polarizer and the second polarizer are absorptive polarizers whose polarization axes are in crossed Nicols where they are perpendicular to each other.

The insulating substrates 11 and 21 may be formed of any transparent material such as glass or plastic.

The liquid crystal layer 40 contains a liquid crystal composition. The liquid crystal display device 100A of Embodiment 1 applies voltage to the liquid crystal layer 40 to change the alignment state of the liquid crystal molecules in the liquid crystal composition in response to the applied voltage, thereby controlling the transmission amount of light.

The first substrate 10 and the second substrate 20 are usually bonded to each other with a sealant (not illustrated) surrounding the liquid crystal layer 40. The first substrate 10, the second substrate 20, and the sealant hold the liquid crystal layer 40 in a predetermined region. The sealant can be, for example, an epoxy resin containing inorganic or organic filler and a curing agent.

The liquid crystal display device 100A may have a structure including, as well as the first substrate 10, the liquid crystal layer 40, and the second substrate 20, members such as optical films, including a retardation film, a viewing angle-increasing film, and a luminance-increasing film; external circuits, including a tape-carrier package (TCP) and a printed circuit board (PCB); and a bezel (frame). These members may be any members that are usually used in the field of liquid crystal display devices. The detailed description for each of these additional members is therefore not provided herein.

The display (liquid crystal alignment) mode of the liquid crystal display device 100A is the fringe field switching (FFS) mode.

Although not illustrated in FIG. 1-1 to FIG. 1-4 and FIG. 2, a horizontal alignment film is usually disposed on the surface adjacent to the liquid crystal layer 40 of the first substrate 10 and/or the second substrate 20. The horizontal alignment film functions to align nearby liquid crystal molecules in the direction parallel to the surface thereof. The horizontal alignment film can also cause the major axes of liquid crystal molecules, aligned in the direction parallel to the first substrate 10, to be oriented at a specific in-plane azimuth. The horizontal alignment film is preferably subjected to an alignment treatment such as photo-alignment or rubbing. The horizontal alignment film may be formed of an inorganic material or an organic material.

The alignment of liquid crystal molecules with no voltage applied between the pixel electrode 16 and the common electrode 15 (hereinafter, also referred to simply as an "off state") is controlled to be parallel to the first substrate 10. The term "parallel" as used herein encompasses not only the completely parallel state but also a state equated as the completely parallel state (substantially parallel state) in the art. The pre-tilt angle (angle of inclination in the off state) of liquid crystal molecules is preferably smaller than 3°, more preferably smaller than 1°, from the surface of the first substrate 10.

Voltage is applied to the liquid crystal layer 40 with voltage applied between the pixel electrode 16 and the common electrode 15 (hereinafter, also referred to simply as an "on state"). The alignment of liquid crystal molecules in the on state is controlled by the stack structure on the first substrate 10, including the pixel electrodes 16, the third insulating film 33, and the common electrode 15. The pixel electrodes 16 are provided in the respective pixels. The common electrode 15 is commonly used in the pixels. The term "pixel" means a region corresponding to one pixel electrode 16, and may be a "sub-pixel", "dot", or "picture element" when each pixel is divisionally driven.

The liquid crystal display device 100A of Embodiment 1 has, for example, a dot size of 100 μm×300 μm, which corresponds to the dot size in a 18.5-inch high definition (HD) display.

The behavior of the liquid crystal display device 100A is described.

In the off state, no electric field is generated in the liquid crystal layer 40, so that the liquid crystal molecules are aligned in the direction parallel to the first substrate 10. The alignment azimuth of the liquid crystal molecules is parallel to the polarization axis of one of the first polarizer and the second polarizer, and the first polarizer and the second polarizer are in crossed Nicols. The liquid crystal display device 100A in the off state therefore does not transmit light and provides black display (normally black mode).

In the on state, an electric field corresponding to the voltage level between each pixel electrode 16 and the common electrode 15 is generated in the liquid crystal layer 40. Specifically, since the openings 15a are formed in the common electrode 15, which is closer to the liquid crystal layer 40 than the pixel electrode 16 is, fringe electric fields are generated around the openings 15a. The liquid crystal molecules rotate under the influence of the electric fields, and the alignment azimuth changes from that in the off state to that in the on state. Thereby, the liquid crystal display device 100A in the on state transmits light and provides white display.

FIG. 3 is a schematic cross-sectional view of a TFT and a contact hole in the liquid crystal display device of Embodiment 1. FIG. 3 shows a cross section taken along the line c-d shown in FIG. 1-1.

Each TFT 18 includes the gate electrode 18a, the source electrode 18b, the drain electrode 18c, and the semiconductor layer 18f. The gate electrode 18a, the source electrode 18b, and the drain electrode 18c are connected to the corresponding scanning line 12, the corresponding data line 13, and the corresponding pixel electrode 16, respectively.

Each pixel electrode 16 is connected to the drain electrode 18c of the corresponding TFT 18 through the corresponding contact hole 51 formed in the second insulating film 32. The drain lead line 19 connected to the drain electrode 18c extends to around the central portion of the corresponding pixel and connected to the corresponding counter electrode 17. Hence, the pixel electrode 16 is electrically connected not only to the drain electrode 18c but also to the counter electrode 17 through the contact hole 51. The third insulating film 33 is disposed between the common electrode 15 and the pixel electrode 16. The gate electrode 18a and the semiconductor layer 18f overlap each other with the first insulating film (gate insulator) 31 in between.

The first insulating film (gate insulator) 31 and the third insulating film 33 can each be, for example, an inorganic film (relative permittivity ε=5 to 7) such as a silicon nitride (SiNX) film or a silicon oxide (SiO$_2$) film, or a stack of such films. The second insulating film 32 also preferably includes an inorganic film 32a and an organic film 32b stacked on the inorganic film 32a. This can reduce parasitic capacitance between the data line 13 and the pixel electrode 16 and parasitic capacitance between the data line 13 and the common electrode 15, and also reduce a short circuit between the data line 13 and the common electrode 15. The organic film 32b preferably has a thickness of substantially 1 to 4 μm. The inorganic film 32a is preferably, for example, an inorganic film (relative permittivity ε=5 to 7) such as a silicon nitride (SiNX) film or a silicon oxide (SiO$_2$) film, or a stack of such films. The organic film 32b is preferably, for example, an organic film (relative permittivity ε=3 to 4) having a lower relative permittivity than the inorganic film 32a, such as a photosensitive acrylic resin.

The first insulating film (gate insulator) 31 preferably has a thickness of 0.05 μm to 0.6 μm. The third insulating film 33 preferably has a thickness of 0.1 μm to 1.0 μm. The second insulating film 32 preferably includes the inorganic film 32a having a thickness of 0.1 μm to 1.0 μm and the organic film 32b having a thickness of 1 μm to 4 μm.

The source electrode 18b and the drain electrode 18c of the TFT 18 are formed directly on the semiconductor layer 18f through no contact hole penetrating an insulating film. The source electrode 18b is connected to the drain electrode 18c via the semiconductor layer 18f. A scanning signal input to the gate electrode 18a through the scanning line 12 controls turning on/off of the current flowing through the semiconductor layer 18f (channel layer), and transfer of a data signal to be input through the data line 13 to the source electrode 18b, the semiconductor layer 18f, the drain electrode 18c, the drain lead line 19, and the pixel electrode 16 in the given order.

The semiconductor layer 18f of the TFT 18 includes, for example, a high-resistance semiconductor layer formed of a material such as amorphous silicon or polysilicon, and a low-resistance semiconductor layer formed of a material such as n+ amorphous silicon obtained by doping amorphous silicon with an impurity such as phosphorus. The semiconductor layer 18f may be formed of an oxide semiconductor such as zinc oxide. The shape of the semiconductor layer 18f can be determined by forming a layer by a technique such as plasma-enhanced chemical vapor deposition (PECVD) and patterning the layer by a technique such as photolithography.

Figures 1, 2, 3, 4:
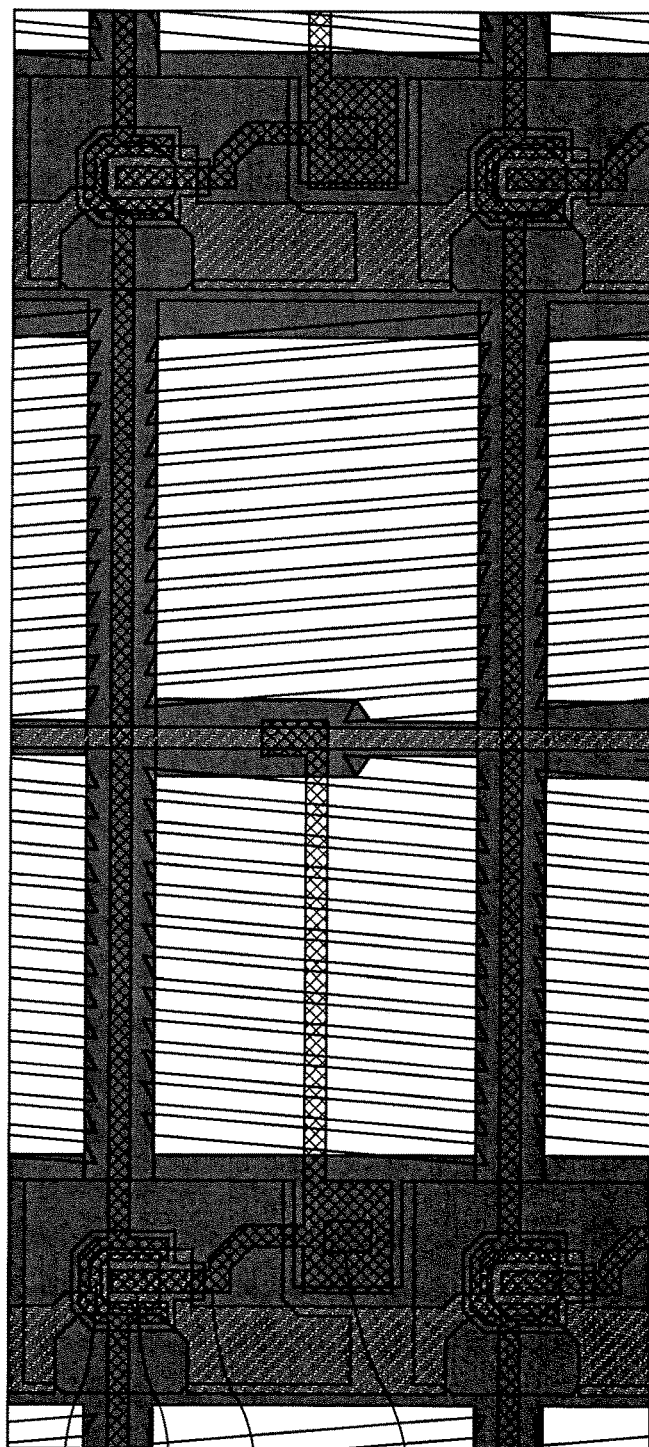
Figure 2:
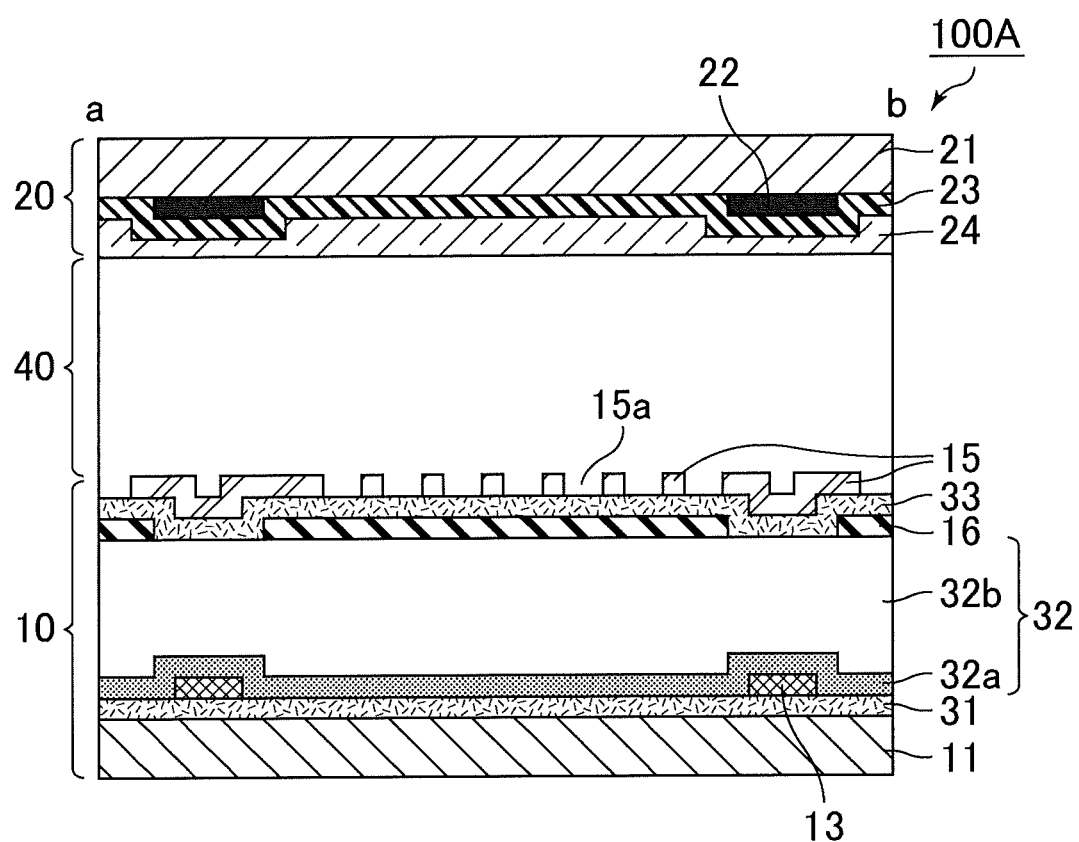
Figure 3:
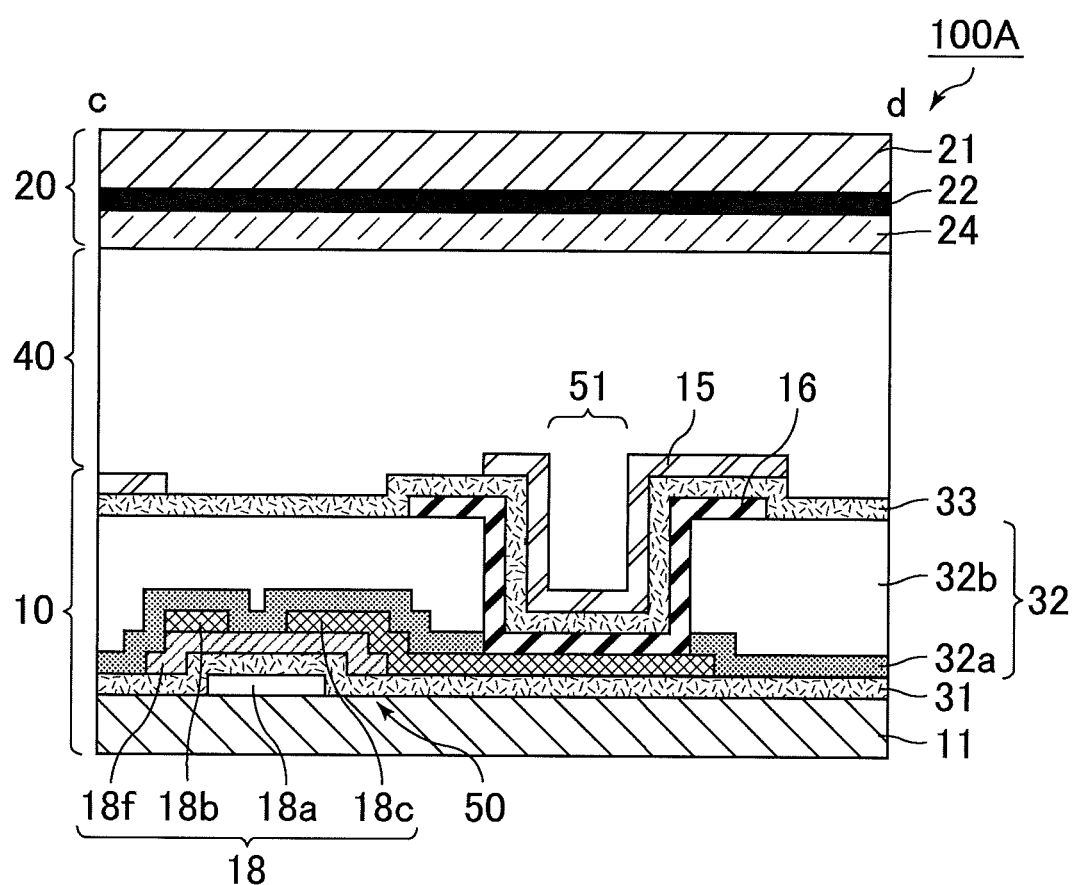
Figure 4:
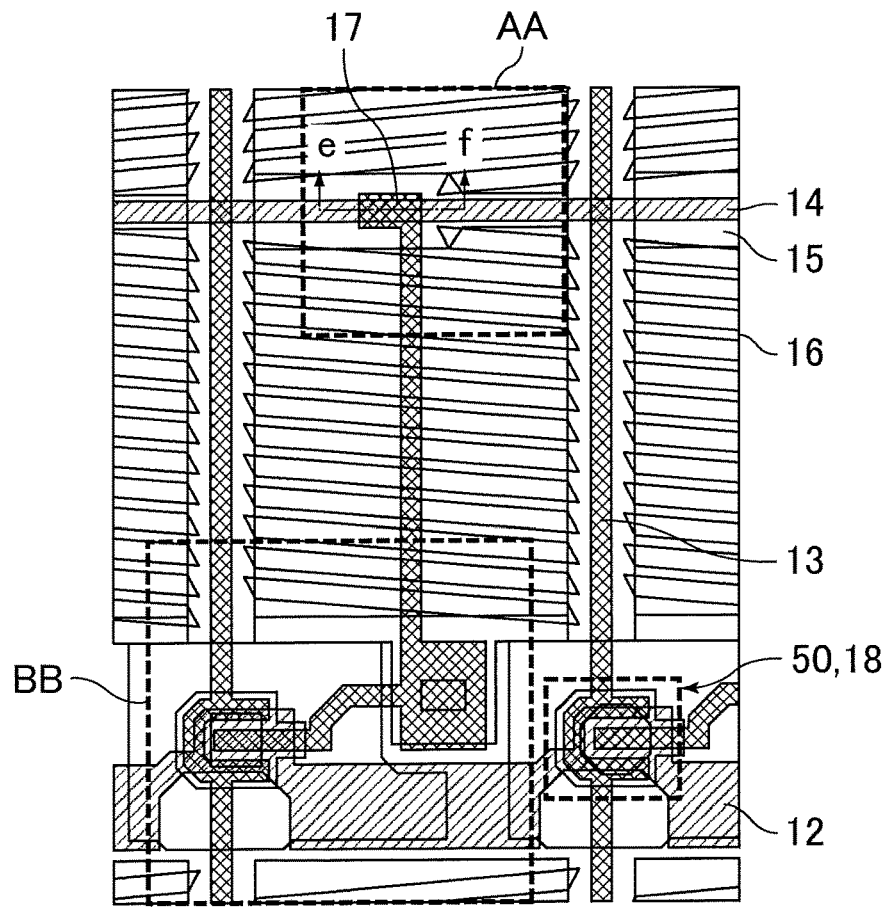
Figure 5:
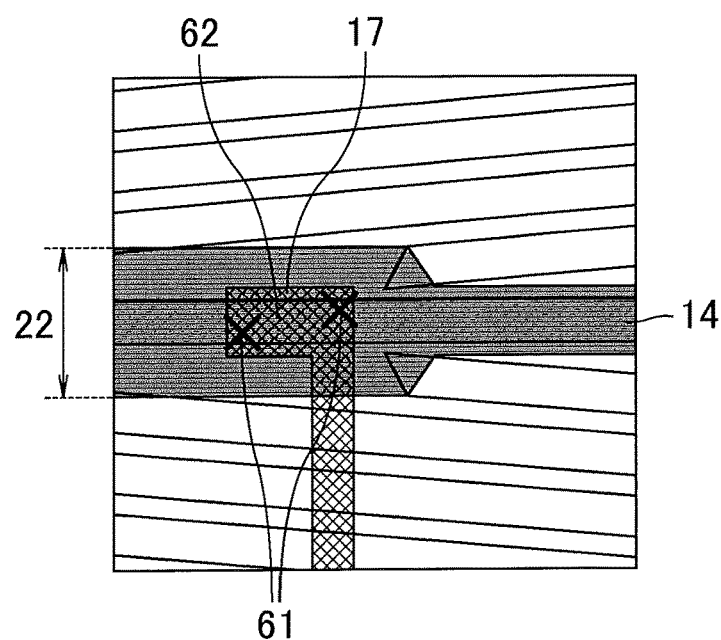
FIG. 5 is a schematic enlarged plan view of the portion AA in the liquid crystal display device of Embodiment 1 shown in FIG. 4.
Figures 1, 6:
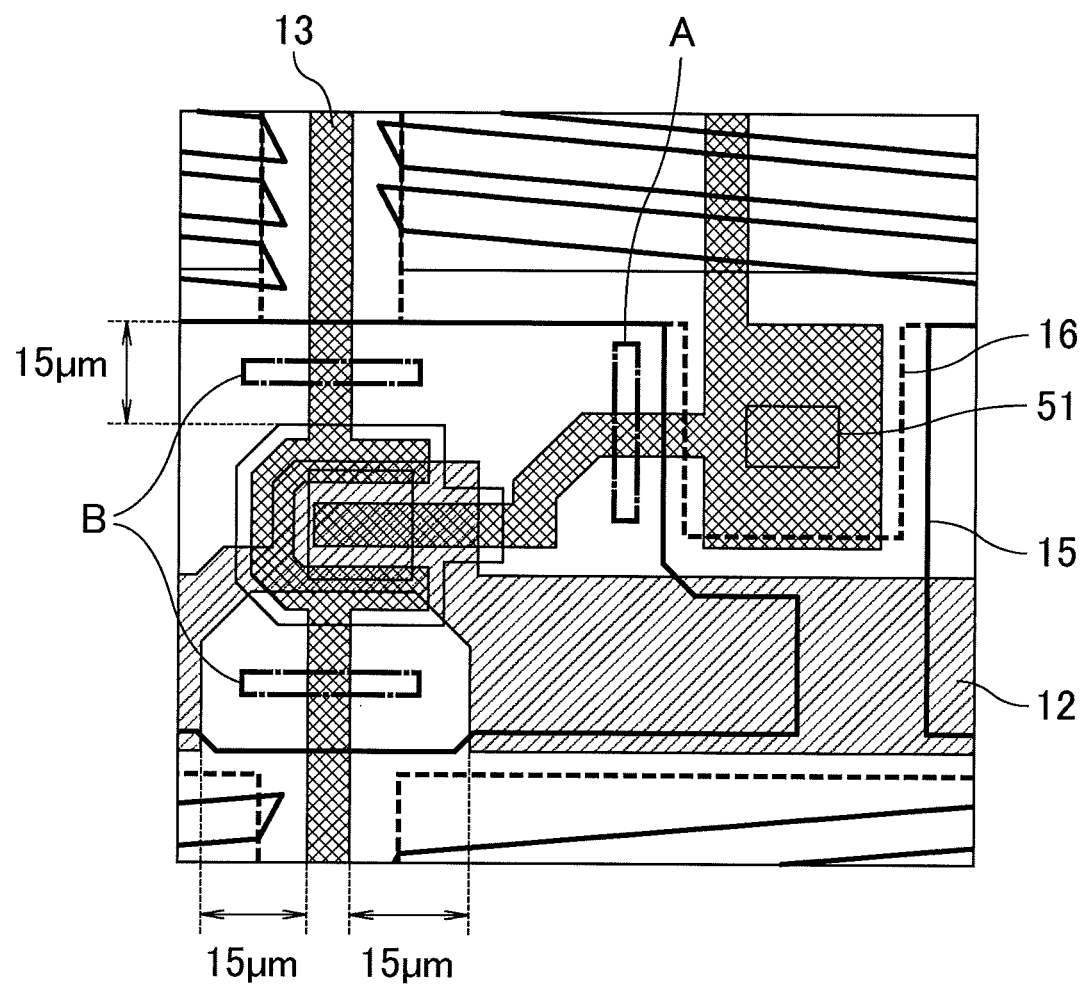
Figures 2, 6:
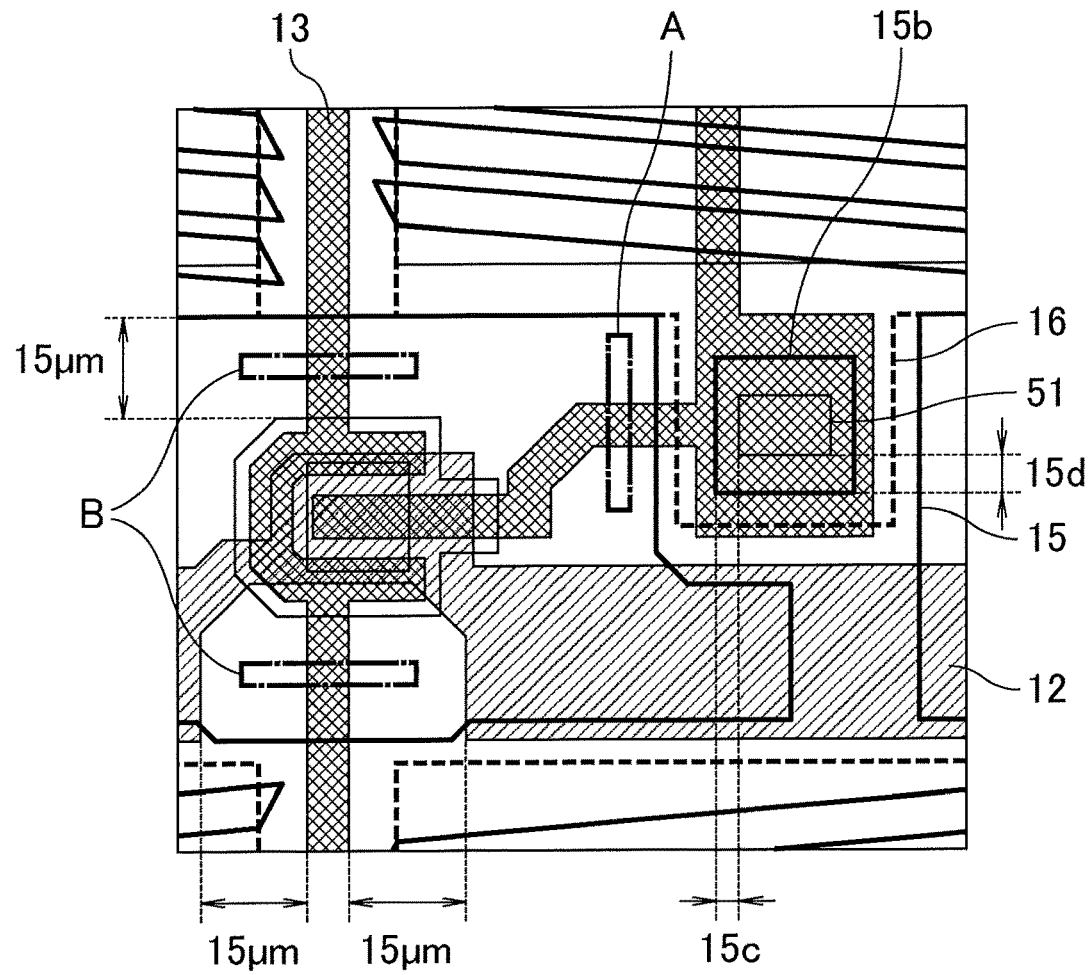

The method for correcting a defective pixel is described with reference to FIG. 4 to FIG. 6-1. FIG. 4 is a schematic plan view of the liquid crystal display device of Embodiment 1, illustrating a portion of a pixel. FIG. 5 is a schematic enlarged plan view of the portion AA in the liquid crystal display device of Embodiment 1 shown in FIG. 4. FIG. 6-1 is an exemplary schematic enlarged plan view of the portion BB in the liquid crystal display device of Embodiment 1 shown in FIG. 4.

The common electrode 15 is connected, around the display region, to the common lines 14 formed using the same layer as the scanning lines 12. Each pixel electrode 16 is connected, in the corresponding pixel, to the corresponding counter electrode 17 formed using the same layer as the data lines 13. When the pixel becomes a defective pixel, the common electrode 15 and the pixel electrode 16 need to be melt-connected by laser irradiation to correct the pixel to appear as a black spot pixel. In such a case, for example, as shown in FIG. 5, a laser beam can be applied to the "x" site in the overlapping portion 62 of the common line 14 and the counter electrode 17 from behind the first substrate 10.

The pixel is regarded as a defective pixel and needs to be corrected when, for example, a short circuit occurs between the source electrode 18b and the drain electrode 18c of the TFT 18. In such a case, the disconnection site A in FIG. 6-1 is irradiated with a laser beam to separate the pixel electrode 16 from the TFT 18, and then the overlapping portion 62 is irradiated with a laser beam, so that the common line 14 and the counter electrode 17 are melt-connected.

When a short circuit occurs between the scanning line 12 and the data line 13, the disconnection sites B as well as the disconnection site A in FIG. 6-1 are irradiated with a laser beam to isolate the data line 13, and then the overlapping portion 62 is irradiated with a laser beam. For the portion of the isolated data line 13 to which no data signal is input from the driver (not illustrated), signal input is performed through a bypass line (not illustrated) formed outside the display region. As in the liquid crystal display device 100A of Embodiment 1, the common line 14 is disposed away from the intersection of the scanning line 12 and the data line 13 (near the central portion of the pixel). This structure allows cutting of the data line 13 at the disconnection sites B in FIG. 6-1 when a short circuit occurs between the scanning line 12 and the data line 13, allowing easy correction of the defective pixel.

The disconnection sites A and B can be determined as appropriate. Yet, a disconnection site is preferably determined to be any site away from any structure formed in a layer other than the layer to be removed, so that an undesired secondary defect such as leakage current can be avoided. For example, in FIG. 6-1, other conductive lines or electrode layers are not formed in a region within 15 µm from each of the disconnection sites B. Preferably, another conductive line or electrode layer such as the common electrode 15 is not formed in a region within 10 to 20 µm from each of the disconnection sites A and B.

The common electrode 15 and the pixel electrode 16 are present at laser irradiation sites 61. These sites are to be connected for correction of the defective pixel, and thus there will be no problem even when leakage current is caused by laser irradiation. For alignment stability of the liquid crystal molecules, the common electrode 15 is preferably disposed at the laser irradiation sites 61, i.e., at the overlapping portion 62.

Although the common electrode 15 is disposed in the contact hole 51 as shown in FIG. 6-1, the common electrode 15 may not be disposed in the contact hole 51 as long as the vicinity of the contact hole 51 is sufficiently shielded from light. If the second insulating film 32 (particularly the organic film 32b) is thick and the contact hole 51 involves a steep inclination, defects such as cracks tend to occur in the third insulating film 33, which may cause a short circuit between the common electrode 15 and the pixel electrode 16. With no common electrode 15 in the contact holes 51, the yield can be increased.

FIG. 6-2 is another exemplary schematic enlarged plan view of the portion BB in the liquid crystal display device of Embodiment 1 shown in FIG. 4. As described above, as long as the vicinity of the contact hole 51 is sufficiently shielded from light, the common electrode 15 may not be disposed in the contact hole 51 as shown in FIG. 6-2. In this case, an opening 15b is formed in the common electrode above the contact hole 51 so that the common electrode 15 does not overlap the contact hole 51 in a plan view. The distance between the outline of the contact hole 51 and the outline of the opening 15b in the common electrode in a plan view is preferably, for example, 2 µm or longer, in consideration of the taper of the contact hole 51 and misalignment caused in photolithography. In a plan view, the distance 15c in the horizontal direction (row direction) can be 6 µm, for example, and the distance 15d in the vertical direction (column direction) can be 8.5 µm, for example.

Figure 7:
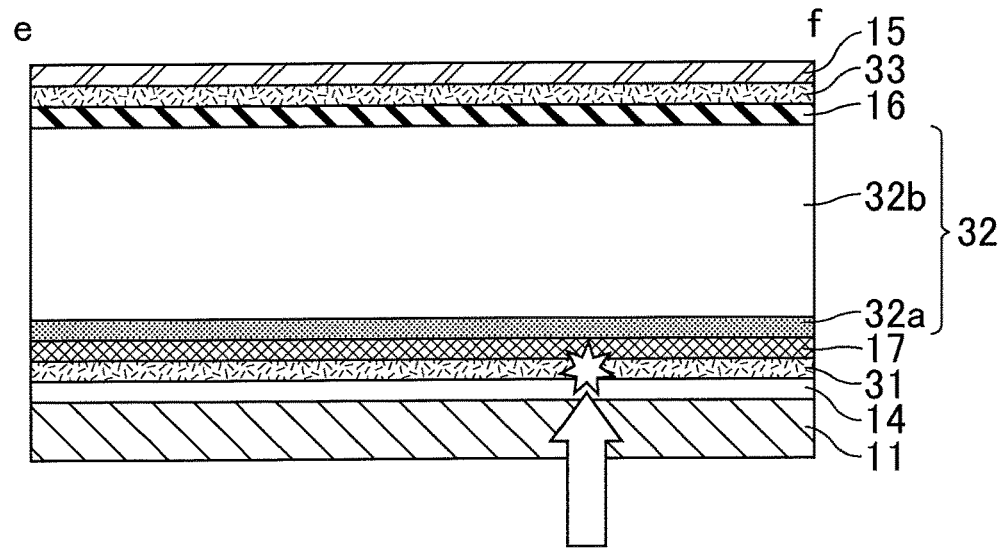
FIG. 7 is a schematic cross-sectional view of an overlapping portion of a common line and a counter electrode on a first substrate in the liquid crystal display device of Embodiment 1.

The laser irradiation sites 61 are described with reference to FIG. 4, FIG. 5, and FIG. 7. FIG. 7 is a schematic cross-sectional view of an overlapping portion of a common line and a counter electrode on a first substrate in the liquid crystal display device of Embodiment 1. FIG. 7 shows a cross section taken along the line e-f shown in FIG. 4.

As shown in FIG. 5, the counter electrode 17 extends outside the outline of the common line 14. This is for easy identification of the irradiation site in laser irradiation from the first substrate 10 side as shown in FIG. 7. The details are described below.

The common line 14 in the liquid crystal display device 100A of Embodiment 1 is disposed at a boundary between two adjacent regions where the openings 15a in the common electrode 15 are oriented in different directions, i.e., a boundary between two regions where the rotation directions of the liquid crystal molecules are different from each other when voltage is applied between the pixel electrode 16 and the common electrode 15. This is because when the common line 14 is disposed at a boundary, which does not much contribute to display in the display region, a transmittance decrease can be reduced. The boundary, which is between two regions where the alignment azimuths of the liquid crystal molecules in the on state are different from each other, also has a low response speed and can cause a decrease in the contrast ratio or cause an afterimage. In order to avoid such phenomena, a black matrix (light-shielding film) 22 as shown in FIG. 1-4 and FIG. 5 may be disposed on the counter substrate 20.

The black matrix 22 keeps the site to be irradiated with a laser beam from sight as viewed from the counter substrate 20 side in laser irradiation. Thus, the irradiation site needs to be identified from behind the first substrate 10. The counter electrode 17 is formed using the same layer as the data line 13, and is thus farther from the back of the first substrate 10 than the common line 14 formed using the same layer as the scanning line 12 is. This means that the laser irradiation site cannot be identified if the counter electrode 17 is formed inside the area of the common line 14. For this reason, the counter electrode 17 extends outside the outline of the common line 14 at the laser irradiation sites 61.

Figure 8:
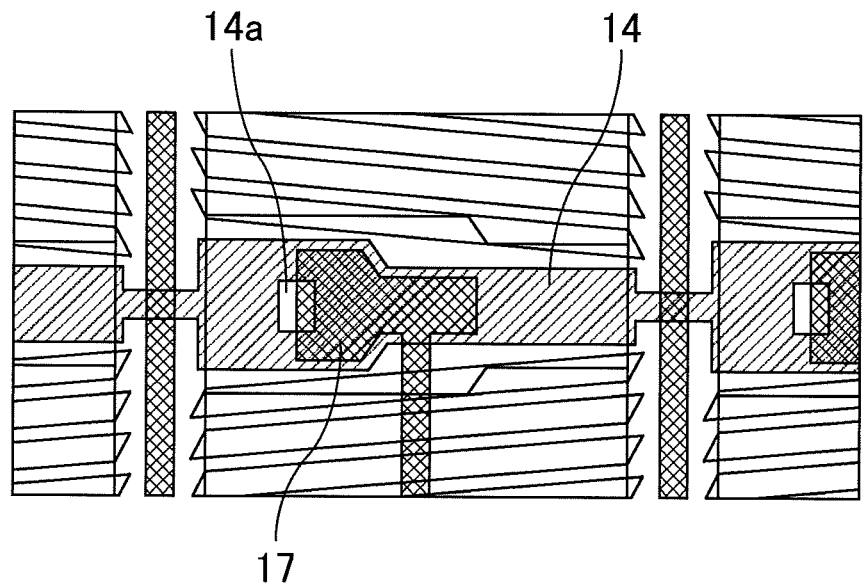
FIG. 8 is a schematic plan view of an exemplary shape of an opening in a common line in the liquid crystal display device of Embodiment 1.

FIG. 8 is a schematic plan view of an exemplary shape of an opening in a common line in the liquid crystal display device of Embodiment 1. FIG. 9 is a schematic plan view of an exemplary shape of an opening in a common line in the liquid crystal display device of Embodiment 1. Other methods to identify the laser irradiation site may be, for example, a method which provides openings 14a in each common line 14 and extends each opening 14a outside the outline of the corresponding counter electrode 17 as shown in FIG. 8, or a method which provides the openings 14a to the common line 14 and superimposes each of the openings 14a entirely on the corresponding counter electrode 17 as shown in FIG. 9.

For correction of a defective pixel in the liquid crystal display device 100A of Embodiment 1, a suitable laser may be, for example, neodymium yttrium aluminum garnet laser (Nd:YAG Laser). For example, a laser oscillator HSL-4000II available from Hoya Candeo Optronics Corporation may be used for the correction.

Embodiment 2

A liquid crystal display device 200A of Embodiment 2 has the same configuration as the liquid crystal display device 100A of Embodiment 1 except for the positions of the openings 15a in the common electrode 15 and the positions and structure of the contact holes 51. Hence, three features unique to the present embodiment are mainly described below, and the same features as those in Embodiment 1 are not described.

Figure 10:
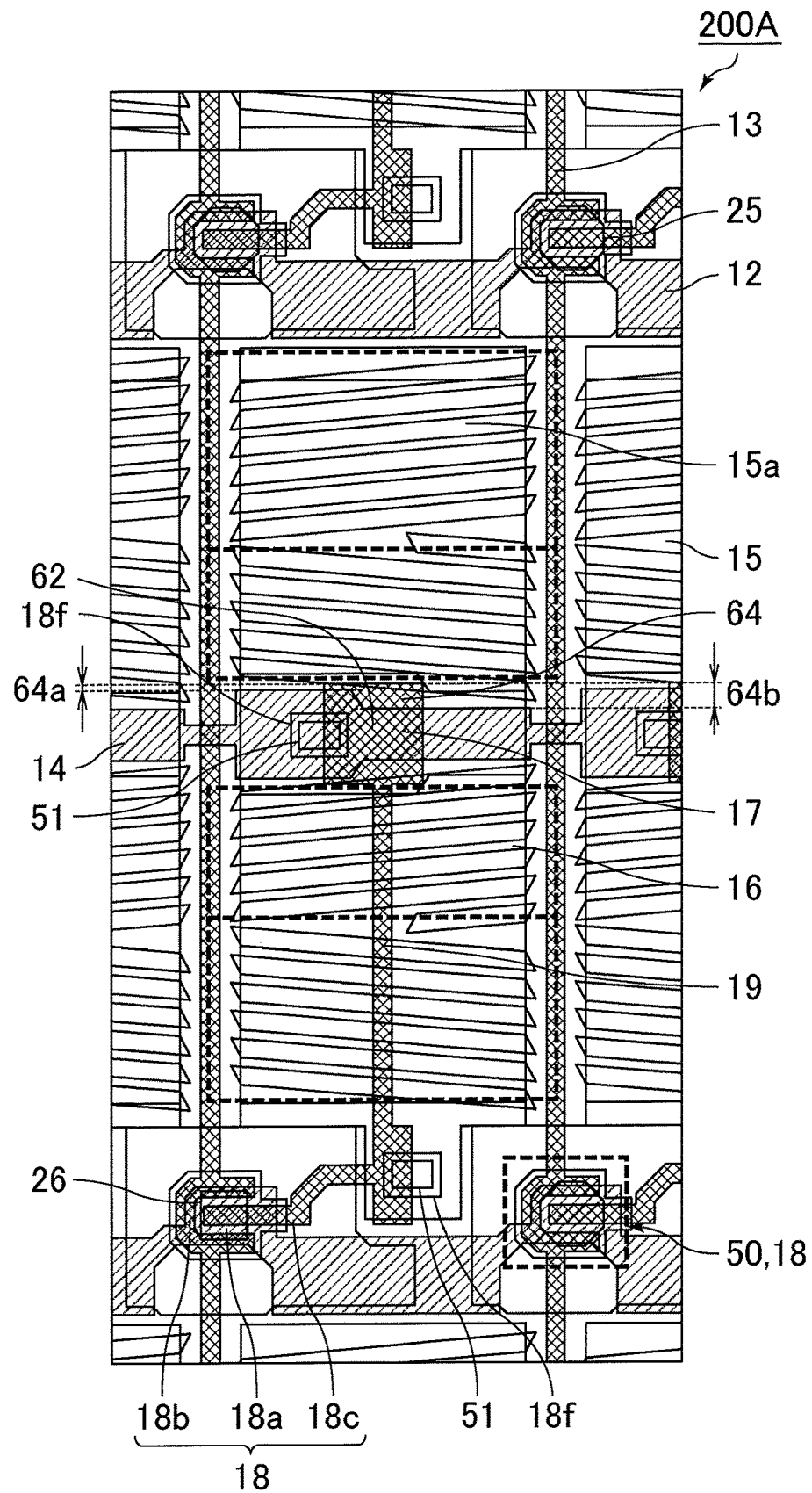
FIG. 10 is a schematic plan view of a liquid crystal display device of Embodiment 2.

A first feature of the liquid crystal display device 200A of Embodiment 2 is described. FIG. 10 is a schematic plan view of a liquid crystal display device of Embodiment 2. In the liquid crystal display device 200A of Embodiment 2, each pixel surrounded by the corresponding scanning lines 12 and the corresponding data lines 13 includes four regions defined by the dotted lines as shown in FIG. 10. In each of the four regions, the openings 15a in the common electrode 15 are oriented in the same direction, and the openings 15a in adjacent regions are oriented in different directions from each other. The rotation direction of the liquid crystal molecules with voltage applied depends on the orientation of the openings 15a in the common electrode 15. This means that the liquid crystal display device 200A of Embodiment 2 includes four regions where the alignment azimuths of the liquid crystal molecules in adjacent regions are different from each other.

The first feature of the liquid crystal display device 200A of Embodiment 2 is further described. For compensation of the viewing angle of the liquid crystal display device, liquid crystal molecules in each pixel may be rotated at different azimuths with voltage applied, to form liquid crystal domains in which the rotation azimuths of the liquid crystal molecules in adjacent regions are different from each other. With liquid crystal domains formed by applying voltage to the liquid crystal display device having a large pixel size (for example, 100 μm×300 μm) as in Embodiment 1, the alignment regions may be visually observed as stripe (belt-like) lines if the number of the liquid crystal domains is small, i.e., if the region where the alignment states of the liquid crystal molecules in the on state are the same is large. The liquid crystal display device 200A of Embodiment 2 is therefore provided with the slit openings 15a in the four regions of the common electrode 15 and with the common line 14 disposed along one of the boundaries defining the four regions so that four liquid crystal domains can be formed in the on state. This can reduce the region where the alignment states of the liquid crystal molecules in the on state are the same.

The second feature of the liquid crystal display device 200A of Embodiment 2 is described. The liquid crystal display device 200A of Embodiment 2 is provided with a contact hole 51 to electrically connect a pixel electrode 16 and the corresponding TFT 18 also at each overlapping portion 62 of a common line 14 and a counter electrode 17. In other words, the pixel electrode 16 is connected to the counter electrode 17 through the second contact hole 51 formed in the second insulating film 32 on the counter electrode 17. Also in this case, the counter electrode 17 extends outside the outline of the common line 14.

As shown in FIG. 10, the counter electrode 17 includes an outside portion 64 that extends outside the outline of the common line 14 in the direction perpendicular to the common line 14. The outside portion 64 includes a first region 64a where the second contact hole 51 is formed in the direction perpendicular to the common line 14, and a second region 64b where no second contact hole 51 is formed in the direction perpendicular to the common line 14. The width (the distance as shown by the upper and lower arrows in the left in FIG. 10) of the first region 64a in the direction perpendicular to the common line 14 is preferably smaller than the width (the distance as shown by the upper and lower arrows in the right in FIG. 10) of the second region 64b in the direction perpendicular to the common line 14. In this manner, the part adjacent to the second contact hole 51 of the outside portion 64 is reduced, so that the position of the second contact hole 51 can be identified.

The second feature of the liquid crystal display device 200A of Embodiment 2 is further described. The liquid crystal display device 200A of Embodiment 2 has, for each pixel, two paths to electrically connect the pixel electrode 16 and the TFT 18. This can reduce a defect in the pixel caused by connection failure between the pixel electrode 16 and the TFT 18, increasing the yield. A restriction is likely to be placed on the layout of a liquid crystal display device having a small pixel size, and use of the multiple contact holes 51 may decrease the aperture ratio. In contrast, there will be less restriction on the layout of a liquid crystal display device having a large pixel size, and thus the decrease in the aperture ratio is small.

When the second contact hole 51 is formed at the overlapping portion 62 of the common line 14 and the counter electrode 17, however, fully etching the first insulating film 31 outside the outline of the counter electrode 17 in formation of the second contact hole 51 causes a short circuit between the common line 14 and the pixel electrode 17. To avoid this, as shown in FIG. 10, an island-like semiconductor layer 18f is disposed in the region where the second contact hole 51 is formed, separately from the semiconductor layer 18f constituting the TFT 18. Thereby, the first insulating film 31 can be prevented from being etched.

The third feature of the liquid crystal display device 200A of Embodiment 2 is the contact hole 51 to electrically connect the pixel electrode 16 and the TFT 18, which is formed near the TFT 18. In the liquid crystal display device 200A of Embodiment 2, the contact hole 51 to connect the pixel electrode 16 and the TFT 18 is formed to extend outside the outline of the drain electrode 18c.

Figure 11:
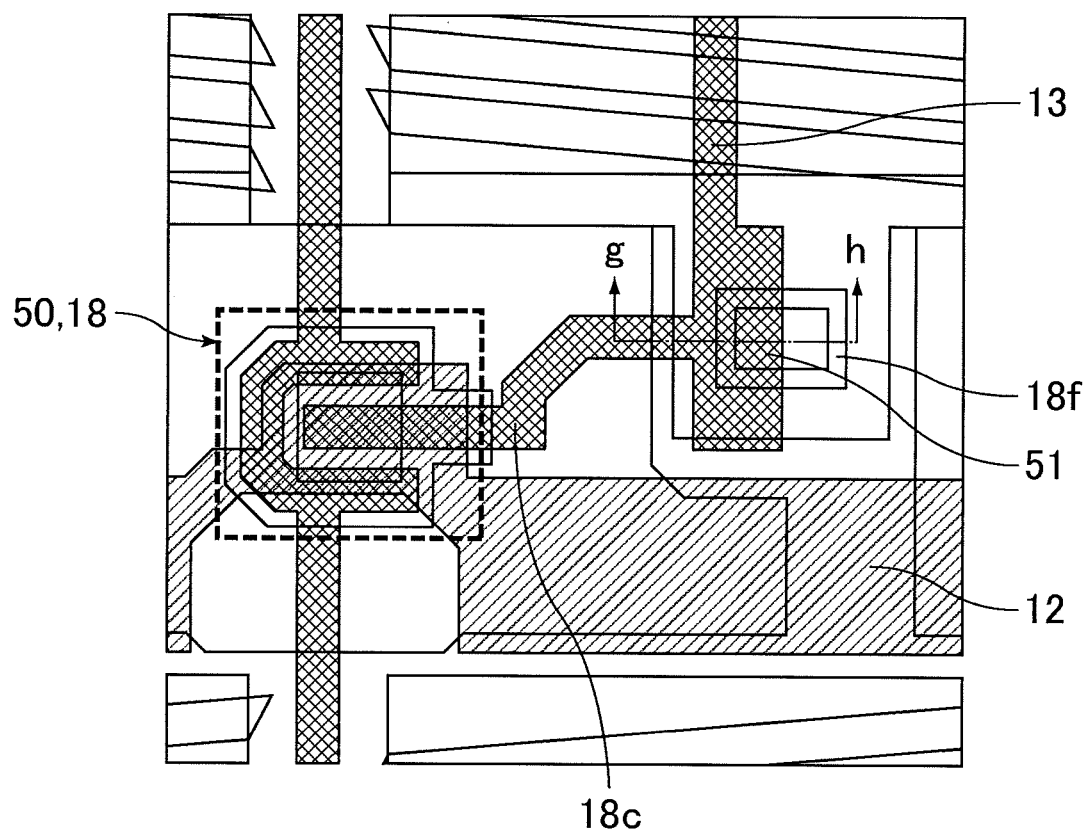
FIG. 11 is a schematic plan view of the liquid crystal display device of Embodiment 2, illustrating a TFT and a contact hole.
Figure 12:
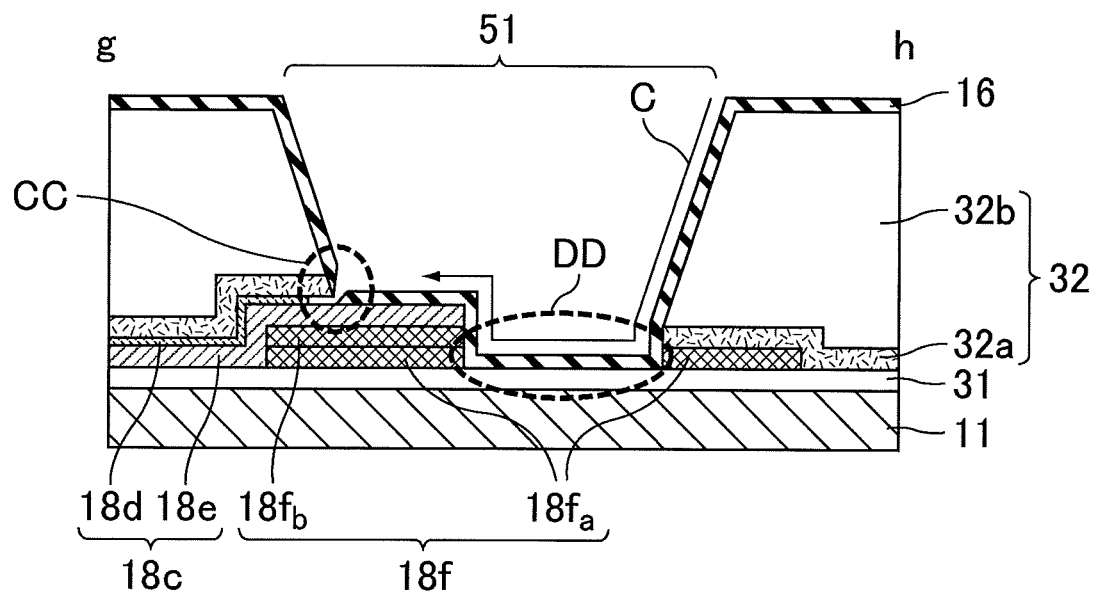
FIG. 12 is a schematic cross-sectional view of a first substrate in the liquid crystal display device of Embodiment 2.

The third feature of the liquid crystal display device 200A of Embodiment 2 is further described with reference to FIG. 11 and FIG. 12. FIG. 11 is a schematic plan view of the liquid crystal display device of Embodiment 2, illustrating a TFT and a contact hole. FIG. 12 is a schematic cross-sectional view of a first substrate in the liquid crystal display device of Embodiment 2. FIG. 12 shows a cross section taken along the line g-h shown in FIG. 11.

As shown in FIG. 12, the drain electrode 18c includes a lower layer 18e formed of a metal other than aluminum, and an upper layer 18d stacked on the lower layer 18e and formed of aluminum. The lower layer 18e contains a metal other than aluminum, such as titanium. Also, the island-like semiconductor layer 18f is formed in the region where the contact hole 51 is to be formed, separately from the semiconductor layer 18f constituting the TFT 18. The semiconductor layer 18f formed in the region where the contact hole 51 is to be formed includes a high-resistance semiconductor layer $18f_a$ and a low-resistance semiconductor layer $18f_b$ stacked thereon. The high-resistance semiconductor layer $18f_a$ contains, for example, amorphous silicon, polysilicon, or oxide semiconductor. The low-resistance semiconductor layer $18f_b$ contains a material such as n+ amorphous silicon obtained by doping amorphous silicon with an impurity such as phosphorus.

The second insulating film 32 includes the inorganic film 32a and the organic film 32b stacked on the inorganic film 32a. In formation of the contact holes 51 in the second insulating film 32, the inorganic film 32a, which is the lower layer constituting the second insulating film 32, and the first insulating film (gate insulator) 31 may be etched in the same pattern as that for the organic film 32b, which is the upper layer constituting the second insulating film 32. In this case, for favorable connection between the pixel electrode 16 and the TFT 18, as shown in FIG. 12, the connection path between the pixel electrode 16 and the drain electrode 18c as indicated by the arrow C can be established by removing aluminum, which is the upper layer 18d in the drain electrode 18c, and bringing the upper surface (surface adjacent to the liquid crystal layer) and the side surface of the lower layer 18e in the drain electrode 18c into contact with the pixel electrode 16.

In this case, as shown in the CC region in FIG. 12, the upper layer 18d of the drain electrode 18c in the contact hole 51 is indented inside the second insulating film 32 from the edge of the second insulating film 32. This structure is likely to make the pixel electrode 16 discontinuous. An effective technique to establish the connection path between the pixel electrode 16 and the TFT 18 is therefore to extend the contact hole 51 outside the outline of the drain electrode 18c. However, with this technique, the first insulating film (gate insulator) 31 may be etched in etching of the inorganic film 32a of the second insulating film 32. To avoid this, the semiconductor layer 18f stacked on the first insulating film 31 can be further disposed as an etching protection film for the first insulating film (gate insulator) 31 in the region corresponding to the contact hole 51. In other words, as shown in the region DD in FIG. 12, the semiconductor layer 18f is disposed on the first insulating film 31 in the region where the contact hole 51 is to be formed, so that the first insulating film 31 can be prevented from being etched. Meanwhile, if the first insulating film 31 is fully etched and thus the insulating substrate 11 is exposed, the pixel electrode 16 is likely to be discontinuous at a portion where the pixel electrode 16 runs up from the insulating substrate 11 to the drain electrode 18c.

The semiconductor layer 18f in the contact hole portion is formed in the same step as that for the semiconductor layer 18f of the TFT 18. The semiconductor layer 18f in the contact hole portion not covered with the counter electrode 17 or drain electrode 18c and the second insulating film 32 may partially remain in a region in the final product of the liquid crystal display device 200A of Embodiment 2, or may completely be removed, followed by partial etching of the first insulating film (gate insulator) 31. The case where the semiconductor layer 18f partially remains is, for example, a case where only the low-resistance semiconductor layer $18f_b$ is removed and at least part of the high-resistance semiconductor layer $18f_a$ remains.

The liquid crystal display device 200A of Embodiment 2 as described above, as with the liquid crystal display device 100A of Embodiment 1, can easily correct a defective pixel to appear as a black spot pixel by irradiating the overlapping portion 62 with a laser beam.

Modified Example 1 of Embodiment 2

Figure 13:
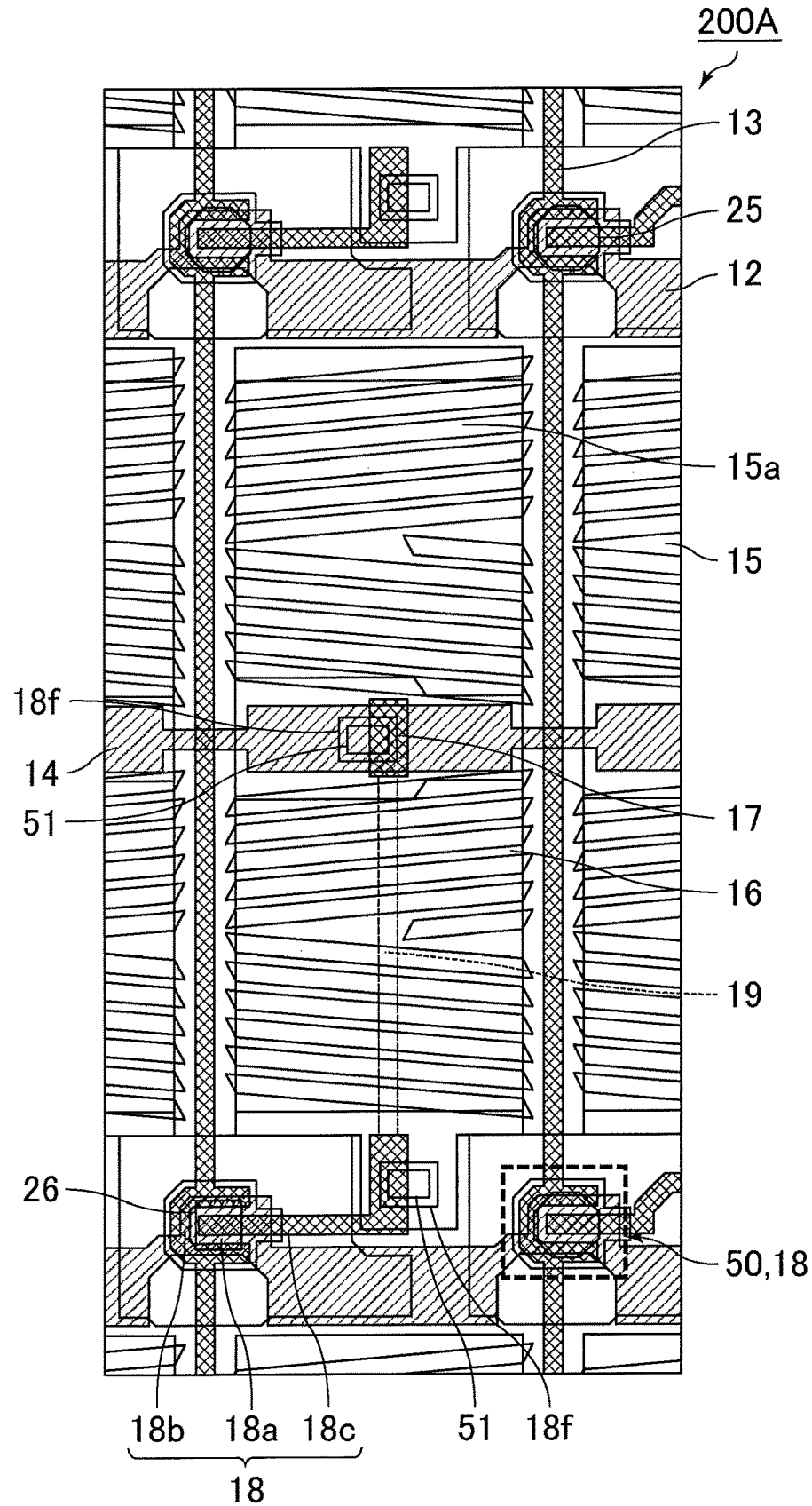
FIG. 13 is a schematic plan view of a liquid crystal display device of Modified Example 1 of Embodiment 2.

FIG. 13 is a schematic plan view of a liquid crystal display device of Modified Example 1 of Embodiment 2. The liquid crystal display device 200A of Modified Example 1 of Embodiment 2 includes no drain lead line 19 to connect two contact holes 51. In the liquid crystal display device 200A of Modified Example 1 of Embodiment 2, the counter electrodes 17 are disposed in the same layer as the drain electrodes 18c of the TFTs 18, and the TFTs 18 and the respective counter electrodes 17 are connected via the respective pixel electrodes 16. Thus, the counter electrodes 17 can be disposed separately from the drain electrodes 18c. This can increase the aperture ratio of the liquid crystal display device 200A.

Modified Example 2 of Embodiment 2

Figure 14:
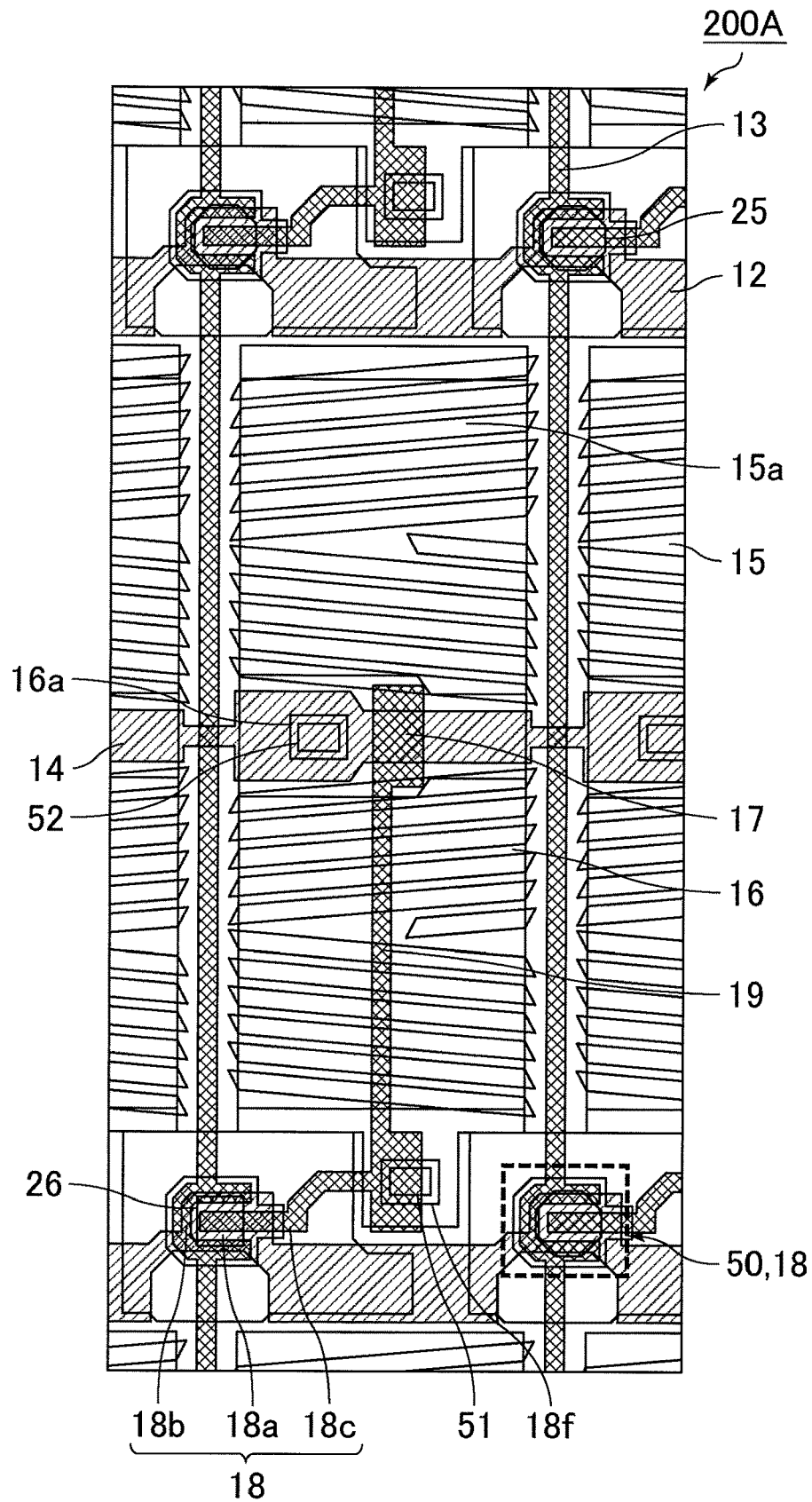
FIG. 14 is a schematic plan view of a liquid crystal display device of Modified Example 2 of Embodiment 2.

FIG. 14 is a schematic plan view of a liquid crystal display device of Modified Example 2 of Embodiment 2. The liquid crystal display device 200A of Modified Example 2 of Embodiment 2 includes in each pixel a contact hole 52 for common line connection, which penetrates the first insulating film 31, the second insulating film 32, and the third insulating film 33 and connects the corresponding common line 14 and the common electrode 15. Outside the contact hole 52 for common line connection is disposed an opening 16a of the corresponding pixel electrode 16. The contact hole 52 for common line connection is formed inside the opening 16a. The liquid crystal display device 200A of Modified Example 2 of Embodiment 2 can more easily stabilize the potential of the common electrode 15 than when the common electrode 15 is connected to a common line 14 only at around the display region. For example, the liquid crystal display device 200A can reduce the potential fluctuations due to parasitic capacitance of the data line 13. The liquid crystal display device 200A can also reduce display defects such as shadowing.

The contact hole 52 for common line connection, which connects the common line 14 and the common electrode 15, in the liquid crystal display device 200A of Modified Example 2 of Embodiment 2 is not necessarily formed in every pixel, and may be disposed only in specific pixels, for example. More specifically, the contact hole 52 may be disposed in sub-pixels of a specific color, e.g., blue sub-pixels, among sub-pixels of a plurality of colors. This structure can also achieve a certain effect. When the contact hole 52 for common line connection is formed in a pixel, particularly in a small pixel, the aperture ratio (transmittance) may decrease. When the pixels in which the contact hole 52 for common line connection is to be formed are limited, a transmittance decrease and display defects such as shadowing can be reduced.

When the common line 14 is formed using the same layer as the data line 13, the contact hole 52 for common line connection may not penetrate the first insulating film 31, and has only to penetrate the second insulating film 32 and the third insulating film 33.

Embodiment 3

Figure 15:
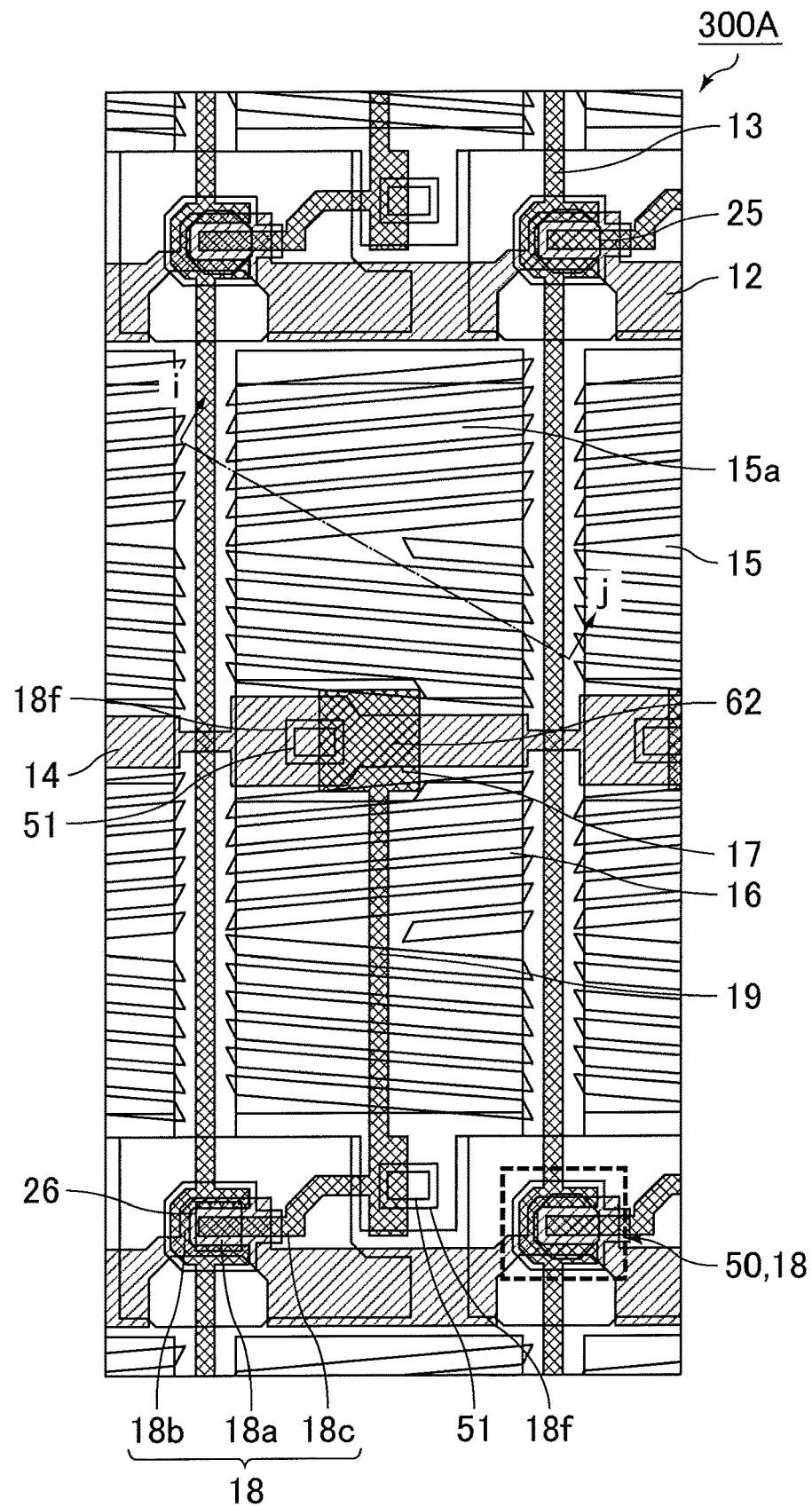
FIG. 15 is a schematic plan view of a liquid crystal display device of Embodiment 3.

FIG. 15 is a schematic plan view of a liquid crystal display device of Embodiment 3. The effect of easily correcting a defective pixel to appear as a black spot pixel have been described using the liquid crystal display device 100A of Embodiment 1 and the liquid crystal display device 200A of Embodiment 2. Another effect of the present invention is described using a liquid crystal display device 300A of Embodiment 3.

In the overlapping portion 62, the common line 14 and the counter electrode 17 overlapping each other can form auxiliary capacitance with the first insulating film 31 in between. The auxiliary capacitance is connected in parallel with liquid crystal capacitance so that parasitic capacitance of the pixel electrode 16 and display defects, such as flicker, shadowing, and luminance change due to charge missing during voltage holding, can be reduced. In the liquid crystal display device 100A of Embodiment 1 and the liquid crystal display device 200A of Embodiment 2, the common line 14 is connected to the common electrode 15. The common line 14 in the liquid crystal display device 300A of Embodiment 3 may be connected to the common electrode 15 or another constant potential line. Voltage different from that applied to the common electrode 15 may be applied to the common line 14.

Figure 16:
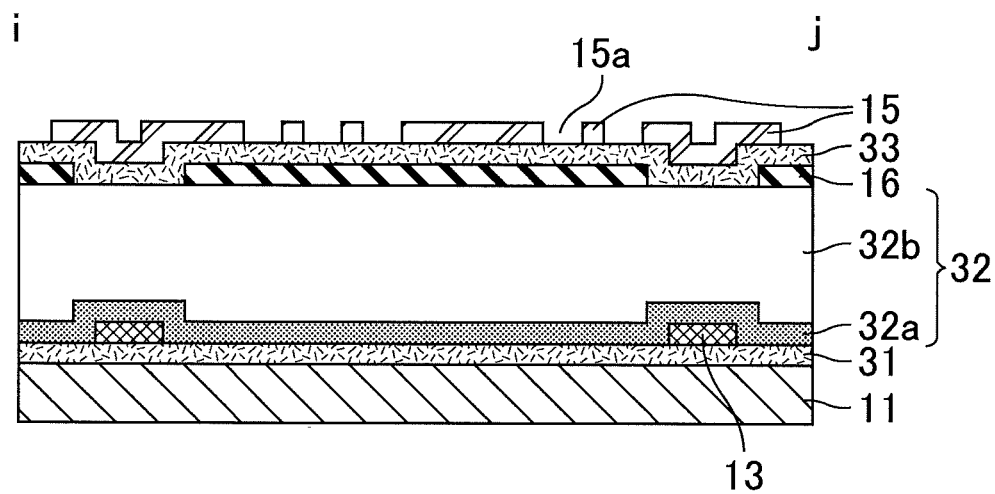
FIG. 16 is a schematic cross-sectional view of a first substrate in the liquid crystal display device of Embodiment 3.
Figure 17:
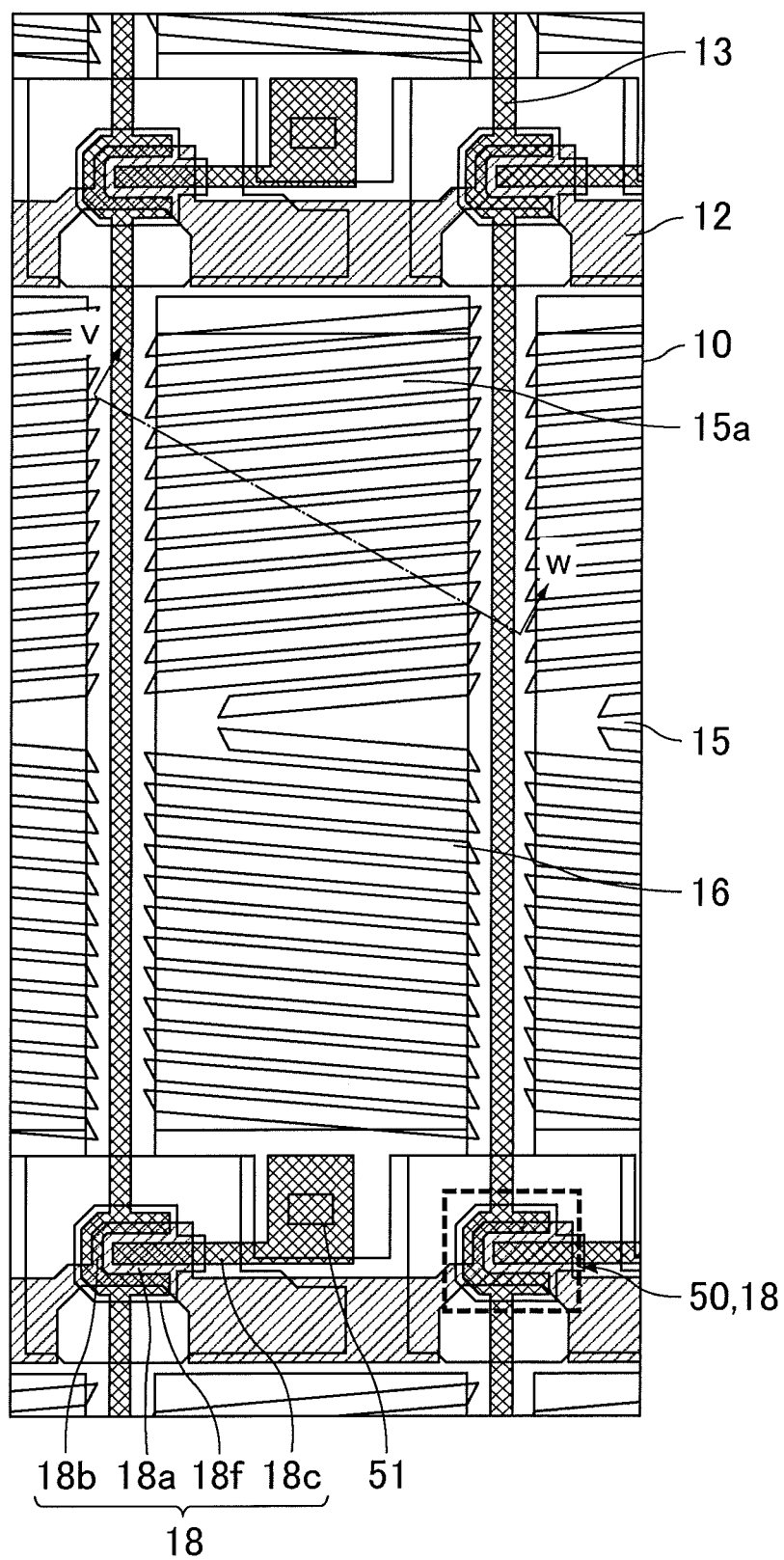
FIG. 17 is a schematic plan view of an active matrix substrate in a liquid crystal display device of Comparative Embodiment 1.
Figure 18:
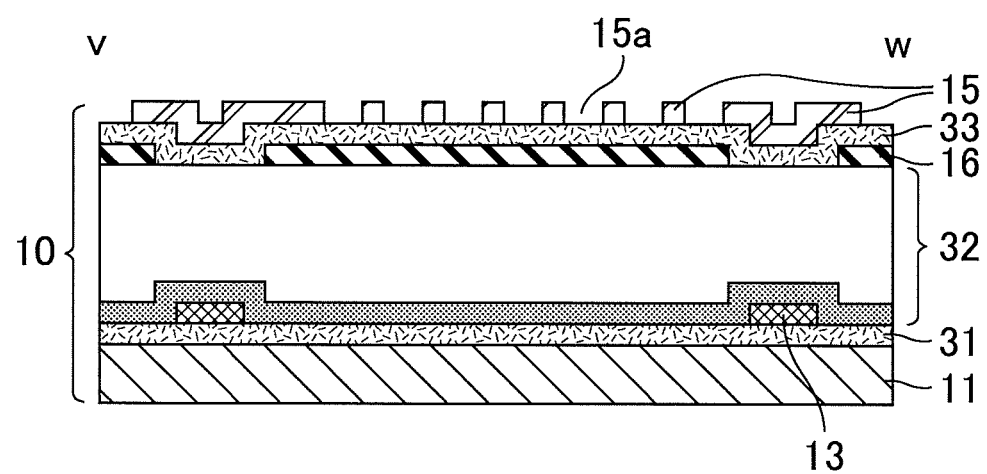
FIG. 18 is a schematic cross-sectional view of the active matrix substrate in the liquid crystal display device of Comparative Embodiment 1.
Figure 19:
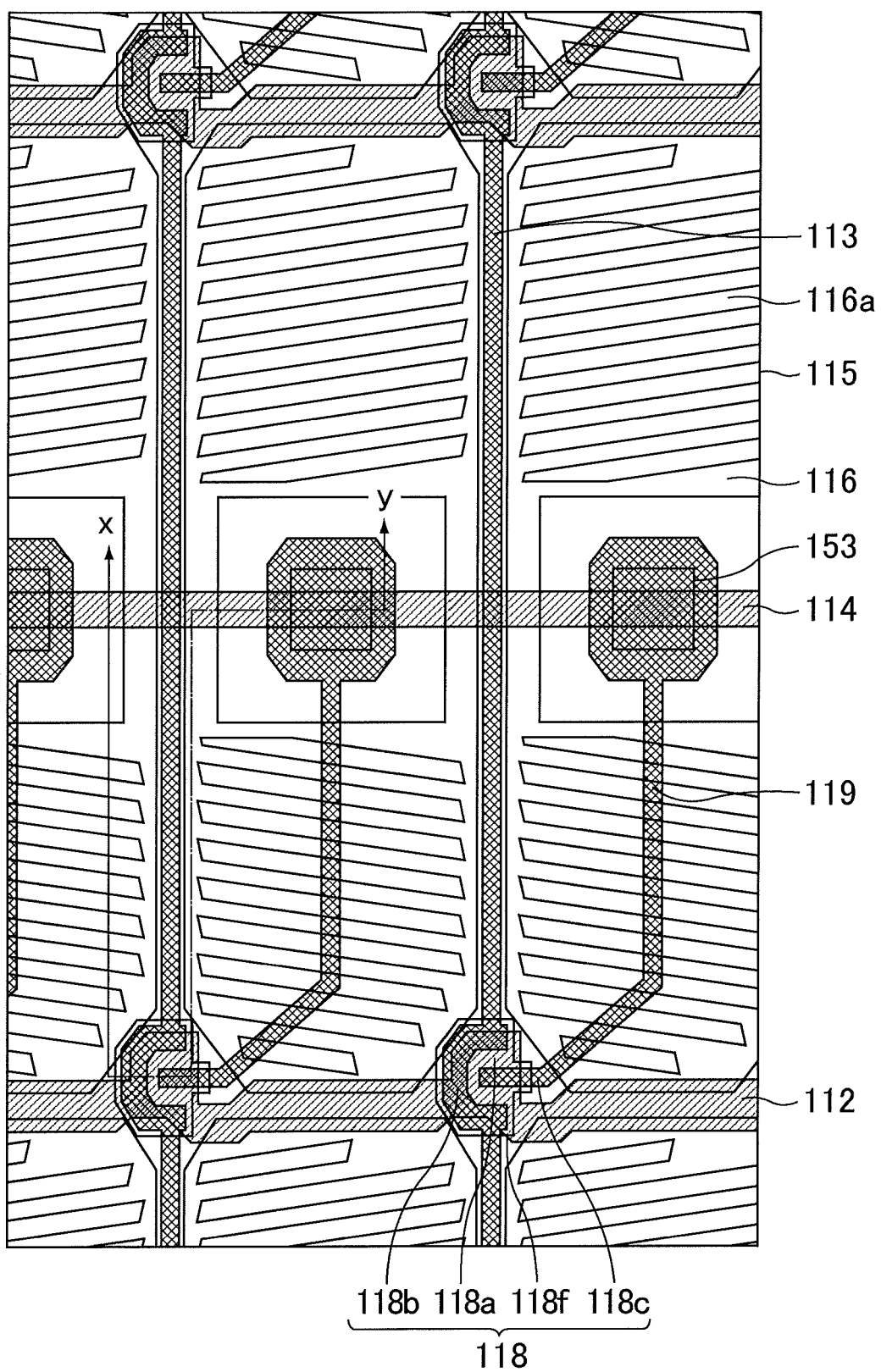
FIG. 19 is a schematic plan view of an active matrix substrate in a liquid crystal display panel disclosed in Embodiment 5 of Patent Literature 1.
Figure 20:
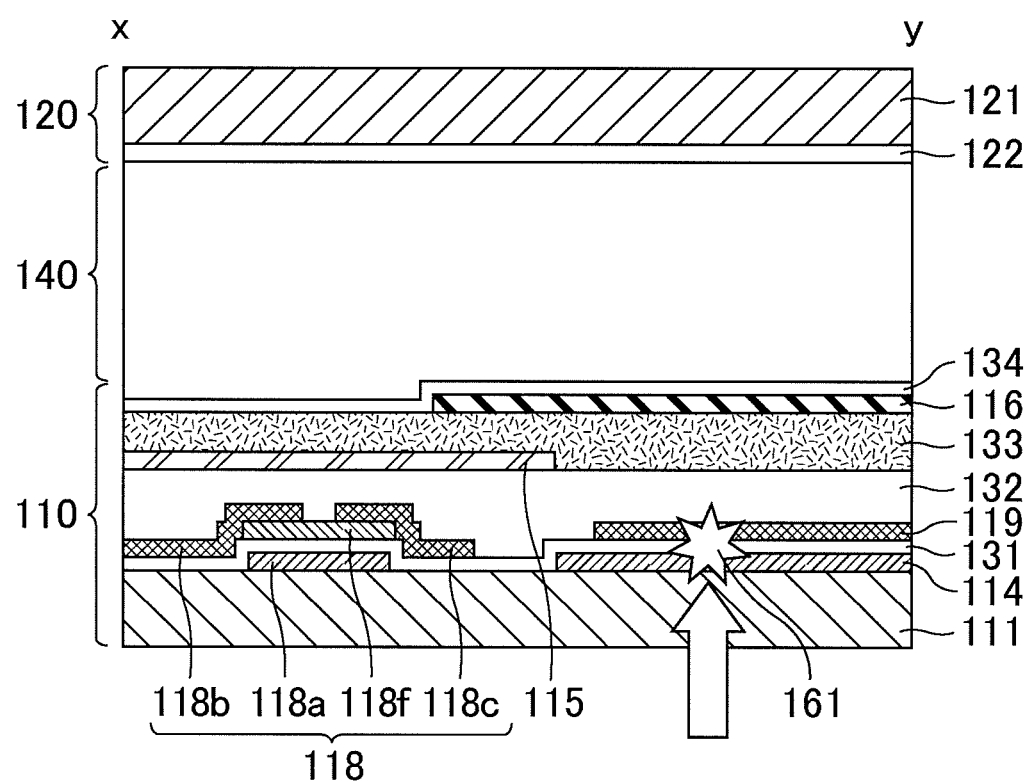
FIG. 20 is a schematic cross-sectional view of a liquid crystal display panel disclosed in Embodiment 5 of Patent Literature 1.

FIG. 16 is a schematic cross-sectional view of a first substrate in the liquid crystal display device of Embodiment 3. FIG. 16 shows a cross section taken along the line i-j shown in FIG. 15.

Auxiliary capacitance is formed between the common electrode 15 and the pixel electrode 16 with the third insulating film 33 in between. The value of the auxiliary capacitance can be adjusted by changing the thickness of the third insulating film 33 or changing the shape (e.g., width of the slits) of the openings 15a in the common electrode 15, for example. However, these methods to adjust the value of auxiliary capacitance largely affect the electric fields that drive the liquid crystal molecules and the yield. Thus, such an adjustment is difficult to make for each product.

The liquid crystal display devices 100A, 200A, and 300A of Embodiments 1 to 3, respectively, form additional auxiliary capacitance in the overlapping portion 62 of the common line 14 and the counter electrode 17, unlike the liquid crystal display device of Comparative Embodiment 1. This structure allows adjustments of the shape and area of the overlapping portion 62 without changing the production conditions for each product (for example, without changing the thickness of the third insulating film 33 for each product) and thus allows easy adjustment of auxiliary capacitance, reducing display defects such as flicker and shadowing.

For only formation of auxiliary capacitance without correction of a defective pixel, the common line 14 needs not to be at the same potential as the common electrode 15. Hence, the common line 14 may be connected to a constant potential line different from the common electrode 15. When the common line 14 is connected to a constant potential line at a potential different from that of the common electrode 15, adjusting the potential of the common line 14 allows adjustment of the potential of the pixel electrode 16 using the auxiliary capacitance, thereby adjusting the voltage to be applied to the liquid crystal layer 40. This can reduce defects such as unevenness. In the case where a defect in the pixel needs to be corrected, supplying the same potential as that supplied to the common electrode 15 to the common line 14 enables easy laser repair.

Some embodiments of the present invention have been described above. Each and every matter described above is applicable to all the aspects of the present invention.

Additional Remarks

One aspect of the present invention may be the liquid crystal display devices 100A, 200A, and 300A each including the first substrate 10, the liquid crystal layer 40, and the second substrate 20 in the given order, the first substrate 10 including: the insulating substrate 11; the scanning lines 12; the data lines 13; the first insulating film 31 disposed between the scanning lines 12 and the data lines 13; the common lines 14 extending in the extension direction of the scanning lines 12 or the data lines 13; the counter electrode 17 facing the common lines 14 with the first insulating film 31 in between; the switching elements 50 being connected to the corresponding scanning line 12 and the corresponding data line 13; the second insulating film 32; the pixel electrodes 16 being connected to the respective switching elements 50 and the respective counter electrodes 17; the third insulating film 33; and the common electrode 15 being provided with openings 15a, the switching elements 50, the second insulating film 32, the pixel electrodes 16, the third insulating film 33, and the common electrode 15 being disposed in the given order toward the liquid crystal layer 40.

Disposing the common electrode 15 in the upper layer of the pixel electrodes 16 with the insulating film 33 in between allows reduction in the number of insulating films between the pixel electrodes 16 and the respective switching elements 50 and the number of insulating films in which contact holes are formed, reducing contact failure between the pixel electrodes 16 and the respective switching elements 50. Also, disposing the common electrode 15 in the upper layer of the pixel electrodes 16 with the insulating film 33 in between allows the pixel electrodes 16 to connect to the respective switching elements 50 without removing the common electrode 15 in the contact hole portions. This can reduce a short circuit between each pixel electrode 16 and the common electrode 15. Also, with a structure in which the counter electrodes 17 connected to the respective switching elements 50 and the respective pixel electrodes 16 face the corresponding common lines 14 with the first insulating film 31 in between, the common lines 14 and the counter electrodes 17 can be formed of a material other than a transparent conductive material and an alloy thereof so as to be suitable for laser repair. Thereby, a defective pixel can be corrected easily by laser repair by supplying the same level of potential (preferably the same potential) as that supplied to the common electrode 15 to the corresponding common line 14, and thereby connecting the corresponding counter electrode 17 to the common line 14 using laser irradiation.

Each switching element 50 may be a thin-film transistor (TFT) 18, and each pixel electrode 16 may be connected to the drain electrode 18c of the corresponding TFT 18 through the corresponding contact hole 51 formed right above the drain electrode 18c, not right above the corresponding counter electrode 17. Such a structure can reduce the restriction on the layout of the drain lead line 19 and defects caused by disconnection.

The switching element 50 may be the thin-film transistor (TFT) 18, the pixel electrode 16 may be connected to the drain electrode 18c of the TFT 18 through the contact hole 51 formed in the second insulating film 32, right above the drain electrode 18c, and the contact hole 51 formed in the second insulating film 32 may be positioned closer to the TFT 18 than the counter electrode 17 is. Such a structure can reduce the restriction on the layout of the drain lead line 19 and defects caused by disconnection.

The contact hole 51 formed right above the drain electrode 18c may extend outside the outline of the drain electrode 18c. This can reduce a defect in the pixel caused by connection failure between the pixel electrode 16 and the TFT 18, increasing the yield.

The second insulating film 32 may include the inorganic film 32a and the organic film 32b stacked on the inorganic film 32a. This can reduce parasitic capacitance between the data line 13 and the pixel electrode 16 and parasitic capacitance between the data line 13 and the common electrode 15, and also reduce a short circuit between the data line 13 and the common electrode 15.

The drain electrode 18c may include the lower layer 18e containing a metal other than aluminum, and the upper layer 18d being stacked on the lower layer 18e and containing aluminum, and the pixel electrode 16 may be in contact with the lower layer 18e of the drain electrode 18c. This can more stably connect the pixel electrode 16 and the drain electrode 18c.

In the contact hole 51, the upper layer 18d of the drain electrode 18c may be indented inside the second insulating film 32 from an edge of the second insulating film 32. This can more stably bring the pixel electrode 16 into contact with the lower layer 18e of the drain electrode 18c.

The first substrate 10 may further include the semiconductor layer 18f stacked on the first insulating film 31 in a region corresponding to the contact hole 51. With this structure, the first insulating film 31 can be prevented from being etched in etching of the second insulating film 32. Meanwhile, if the first insulating film 31 is fully etched and thus the insulating substrate 11 is exposed, the pixel electrode 16 is likely to be discontinuous at a portion where the pixel electrode 16 runs up from the insulating substrate 11 to the drain electrode 18c.

The common electrode 50 may extend over the counter electrode 17. This can improve the alignment stability of liquid crystal molecules in the on state.

The switching element 50 may be the thin-film transistor (TFT) 18, the counter electrode 17 may be disposed in the same layer as the drain electrode 18c of the TFT 18, and the counter electrode 17 may be connected to the drain electrode 18c via the drain lead line 19 disposed in the same layer as the counter electrode 17 and the drain electrode 18c. This can more stably connect the counter electrode 17 and the TFT 18.

The pixel electrode 16 may be connected to the counter electrode 17 through the second contact hole 51 formed in the second insulating film 32, right above the counter electrode 17. This can more stably connect the pixel electrode 16 and the counter electrode 17.

The counter electrode 17 may include the outside portion 64 that extends outside the outline of the common line 14 in the direction perpendicular to the common line 14, the outside portion 64 may include the first region 64a with the second contact hole 51 extending in the direction perpendicular to the common line 14 and the second region 64b with no second contact hole 51 extending in the direction perpendicular to the common line 14, and the width of the first region 64a in the direction perpendicular to the common line 14 may be smaller than the width of the second region 64b in the direction perpendicular to the common line 14. This allows easy identification of the position of the contact hole 51 as viewed from the first substrate 10 side.

The switching element 50 may be the thin-film transistor (TFT) 18, and the counter electrode 17 may be formed in the same layer as the drain electrode 18c of the TFT 18 and may be disposed separately from the drain electrode 18c. This can further increase the aperture ratio.

The common line 14 may be connected to the common electrode 15 through the contact hole (contact hole for common line connection) 52 formed at least in the second insulating film 32 and in the third insulating film 33. This can more easily stabilize the potential of the common electrode 15 than when the common electrode 15 is connected to a common line 14 only at around the display region. For example, this structure can reduce the potential fluctuations due to parasitic capacitance of the data line 13. This can also reduce display defects such as shadowing.

The contact hole (contact hole for common line connection) 52 formed at least in the second insulating film 32 and in the third insulating film 33 may be formed in not all pixels. With this structure, when the pixels in which the contact hole 52 for common line connection is to be formed are limited, a transmittance decrease and display defects such as shadowing can be reduced.

The switching element 50 may be the thin-film transistor (TFT) 18, the pixel electrode 16 may be electrically connected to the thin-film transistor 18 through the contact hole 51 formed in the second insulating film 32, and the common electrode 15 may not be disposed at the position corresponding to the contact hole 51 formed in the second insulating film 32. This can reduce a short circuit between the common electrode 15 and the pixel electrode 16, increasing the yield.

REFERENCE SIGNS LIST

10: first substrate
11, 21: insulating substrate
12: scanning line
13: data line
14: common line
14a: opening in common line
15: common electrode
15a: opening in common electrode
15b: opening in common electrode above contact hole
15c: distance between outline of contact hole and outline of opening in common electrode in horizontal direction in plan view
15d: distance between outline of contact hole and outline of opening in common electrode in vertical direction in plan view
16: pixel electrode
16a: opening in pixel electrode
17: counter electrode
18: TFT (thin-film transistor)
18a: gate electrode
18b: source electrode
18c: drain electrode
18d: upper layer
18e: lower layer
18f: semiconductor layer 18$f_a$: high-resistance semiconductor layer
18$f_b$: low-resistance semiconductor layer
19: drain lead line
20: second substrate
22: black matrix
23: color filter
24: overcoat layer
25: sub-spacer
26: main spacer
31: first insulating film (gate insulator)
32: second insulating film
32a: inorganic film
32b: organic film
33: third insulating film
40: liquid crystal layer
50: switching element
51: contact hole (contact hole to connect pixel electrode with drain electrode or counter electrode)
52: contact hole (contact hole for common line connection to connect common electrode with common line)
61: laser irradiation site
62: overlapping portion
64: outside portion
64a: first region of outside portion
64b: second region of outside portion
A, B: disconnection site
C: connection path between pixel electrode and drain electrode
AA: overlapping portion and vicinity thereof
BB: TFT and vicinity thereof
CC: region where pixel electrode tends to be discontinuous
DD: region where semiconductor layer functions as etching protective film
100A, 200A, 300A: liquid crystal display device
110: active matrix substrate
111: glass substrate
112: gate bus line
113: source bus line
114: auxiliary capacitance line
115: common electrode
116: pixel electrode
116a: slit in pixel electrode
118: TFT
118a: gate electrode
118b: source electrode
118c: drain electrode
118f: semiconductor layer
119: drain lead line
120: counter substrate
121: glass substrate
122: alignment film
131: first insulating film
132: second insulating film
133: third insulating film
134: alignment film
140: liquid crystal layer
153: contact portion
161: laser irradiation site

The invention claimed is:
1. A liquid crystal display device comprising a first substrate, a liquid crystal layer, and a second substrate in the given order,
the first substrate comprising:
an insulating substrate;
a scanning line;
a data line;
a first insulating film disposed between the scanning line and the data line;
a common line extending in an extension direction of the scanning line or the data line;
a counter electrode facing the common line with the first insulating film in between;
a switching element being connected to the scanning line and the data line;
a second insulating film;
a pixel electrode being connected to the switching element and the counter electrode;
a third insulating film; and
a common electrode being provided with an opening,
the switching element, the second insulating film, the pixel electrode, the third insulating film, and the common electrode being disposed in the given order toward the liquid crystal layer,
wherein the switching element is a thin-film transistor,
the pixel electrode is connected to a drain electrode of the thin-film transistor through a contact hole formed in the second insulating film, right above the drain electrode, and
the contact hole formed in the second insulating film is positioned closer to the thin-film transistor than the counter electrode is.

2. The liquid crystal display device according to claim 1, wherein the switching element is a thin-film transistor, and
the pixel electrode is connected to a drain electrode of the thin-film transistor through a contact hole formed right above the drain electrode, not right above the counter electrode.

3. The liquid crystal display device according to claim 1, wherein the contact hole extends outside an outline of the drain electrode.

4. The liquid crystal display device according to claim 3, wherein the second insulating film includes an inorganic film and an organic film stacked on the inorganic film.

5. The liquid crystal display device according to claim 3, wherein the drain electrode includes
a lower layer containing a metal other than aluminum, and
an upper layer being stacked on the lower layer and containing aluminum, and
the pixel electrode is in contact with the lower layer of the drain electrode.

6. The liquid crystal display device according to claim 5, wherein in the contact hole, the upper layer of the drain electrode is indented inside the second insulating film from an edge of the second insulating film.

7. The liquid crystal display device according to claim 3, wherein the first substrate further comprises a semiconductor layer stacked on the first insulating film in a region corresponding to the contact hole.

8. The liquid crystal display device according to claim 1, wherein the common electrode extends over the counter electrode.

9. The liquid crystal display device according to claim 1, wherein the switching element is a thin-film transistor,
the counter electrode is disposed in the same layer as the drain electrode of the thin-film transistor, and
the counter electrode is connected to the drain electrode via a drain lead line disposed in the same layer as the counter electrode and the drain electrode.

10. The liquid crystal display device according to claim 1, wherein the pixel electrode is connected to the counter electrode through a second contact hole formed in the second insulating film, right above the counter electrode.

11. The liquid crystal display device according to claim 10,
wherein the switching element is a thin-film transistor, and
the counter electrode is formed in the same layer as the drain electrode of the thin-film transistor and is disposed separately from the drain electrode.

12. The liquid crystal display device according to claim 1, wherein the common line is connected to the common electrode through a contact hole formed at least in the second insulating film and in the third insulating film.

13. The liquid crystal display device according to claim 1,
wherein the switching element is a thin-film transistor,
the pixel electrode is electrically connected to the thin-film transistor through a contact hole formed in the second insulating film, and
the common electrode is not disposed at the position corresponding to the contact hole formed in the second insulating film.

14. A liquid crystal display device comprising a first substrate, a liquid crystal layer, and a second substrate in the given order,
the first substrate comprising:
an insulating substrate;
a scanning line;
a data line;
a first insulating film disposed between the scanning line and the data line;
a common line extending in an extension direction of the scanning line or the data line;
a counter electrode facing the common line with the first insulating film in between;
a switching element being connected to the scanning line and the data line;
a second insulating film;
a pixel electrode being connected to the switching element and the counter electrode;
a third insulating film; and
a common electrode being provided with an opening,
the switching element, the second insulating film, the pixel electrode, the third insulating film, and the common electrode being disposed in the given order toward the liquid crystal layer,
wherein:
the pixel electrode is connected to the counter electrode through a second contact hole formed in the second insulating film, right above the counter electrode,
the counter electrode includes an outside portion that extends outside an outline of the common line in the direction perpendicular to the common line,
the outside portion includes a first region with the second contact hole existing in the direction perpendicular to the common line and a second region with no second contact hole existing in the direction perpendicular to the common line, and
a width of the first region in the direction perpendicular to the common line is smaller than a width of the second region in the direction perpendicular to the common line.

15. The liquid crystal display device according to claim 14,
wherein the common line is connected to the common electrode through a contact hole formed at least in the second insulating film and in the third insulating film.

16. The liquid crystal display device according to claim 14,
wherein the switching element is a thin-film transistor,
the pixel electrode is electrically connected to the thin-film transistor through a contact hole formed in the second insulating film, and
the common electrode is not disposed at the position corresponding to the contact hole formed in the second insulating film.

17. A liquid crystal display device comprising a first substrate, a liquid crystal layer, and a second substrate in the given order,
the first substrate comprising:
an insulating substrate;
a scanning line;
a data line;
a first insulating film disposed between the scanning line and the data line;
a common line extending in an extension direction of the scanning line or the data line;
a counter electrode facing the common line with the first insulating film in between;
a switching element being connected to the scanning line and the data line;
a second insulating film;
a pixel electrode being connected to the switching element and the counter electrode;
a third insulating film; and
a common electrode being provided with an opening,
the switching element, the second insulating film, the pixel electrode, the third insulating film, and the common electrode being disposed in the given order toward the liquid crystal layer,
wherein the common line is connected to the common electrode through a contact hole formed at least in the second insulating film and in the third insulating film, and
the contact hole formed at least in the second insulating film and in the third insulating film is formed in not all pixels.

18. The liquid crystal display device according to claim 17,
wherein the switching element is a thin-film transistor,
the pixel electrode is electrically connected to the thin-film transistor through a contact hole formed in the second insulating film, and
the common electrode is not disposed at the position corresponding to the contact hole formed in the second insulating film.

* * * * *